(12) United States Patent
Yamada

(10) Patent No.: US 12,354,034 B2
(45) Date of Patent: Jul. 8, 2025

(54) MANAGEMENT SERVER

(71) Applicant: KAI R & D CENTER CO., LTD., Seki (JP)

(72) Inventor: Akitsugu Yamada, Seki (JP)

(73) Assignee: KAI R & D CENTER CO., LTD., Seki (JP)

( * ) Notice: Subject to any disclaimer, the term of this patent is extended or adjusted under 35 U.S.C. 154(b) by 21 days.

(21) Appl. No.: 17/936,658

(22) Filed: Sep. 29, 2022

(65) Prior Publication Data
US 2023/0214729 A1 Jul. 6, 2023

Related U.S. Application Data

(63) Continuation of application No. PCT/JP2021/013667, filed on Mar. 30, 2021.

(30) Foreign Application Priority Data

Mar. 31, 2020 (JP) .................................. 2020-063746
Sep. 29, 2020 (JP) .................................. 2020-164096

(Continued)

(51) Int. Cl.
*G06Q 10/02* (2012.01)
*G06Q 50/12* (2012.01)
(52) U.S. Cl.
CPC ............. *G06Q 10/02* (2013.01); *G06Q 50/12* (2013.01)
(58) Field of Classification Search
CPC ................................ G06Q 10/02; G06Q 50/12
See application file for complete search history.

(56) References Cited

U.S. PATENT DOCUMENTS

| | | | |
|---|---|---|---|
| 6,975,910 B1* | 12/2005 | Brown ................... | G16H 20/60 707/999.107 |
| 10,860,954 B1* | 12/2020 | Yeluguri ................. | G06F 18/21 |
| 2002/0077872 A1* | 6/2002 | Lancos ................... | G06Q 30/06 705/5 |

(Continued)

FOREIGN PATENT DOCUMENTS

| | | |
|---|---|---|
| CN | 110659408 A | 1/2020 |
| JP | H09274629 A | 10/1997 |

(Continued)

OTHER PUBLICATIONS

Margaret Condrasky, Cooking Camp Provides Hands-On Nutrition Education Opportunity, 2008, p. 37-41 (Year: 2008).*

(Continued)

*Primary Examiner* — Ibrahim N El-Bathy
(74) *Attorney, Agent, or Firm* — Holtz, Holtz & Volek PC

(57) ABSTRACT

A management server enables a user to make a dish on a selected date and time and a selected space designated by a company. A user information management unit manages user information including confirmation information and profile information; a company information management unit manages company information including information regarding a space; a recipe determination unit determines a recipe of the dish on the basis of the user information and the company information; an ordering unit orders at least one of an ingredient and a seasoning for making the dish on the basis of the recipe; and a content management unit manages content related to the recipe to be provided to the user. The confirmation information of the user indicates the selected space and the selected date and time, and the information regarding the designated space includes constraint information regarding use of the space.

12 Claims, 25 Drawing Sheets

(30) Foreign Application Priority Data

| Sep. 29, 2020 | (JP) | 2020-164101 |
| Sep. 29, 2020 | (JP) | 2020-164102 |
| Sep. 29, 2020 | (JP) | 2020-164104 |
| Sep. 29, 2020 | (JP) | 2020-164105 |

(56) References Cited

U.S. PATENT DOCUMENTS

| 2006/0224401 A1* | 10/2006 | Hunt | G06Q 50/12 |
| | | | 705/15 |
| 2009/0037288 A1* | 2/2009 | Christensen | G06F 16/00 |
| | | | 708/133 |
| 2010/0057540 A1 | 3/2010 | Tanaka et al. | |
| 2018/0330925 A1 | 11/2018 | Sim et al. | |
| 2019/0147522 A1* | 5/2019 | Susser | G06Q 10/083 |
| | | | 705/26.8 |
| 2019/0333312 A1 | 10/2019 | Jain et al. | |
| 2021/0279294 A1* | 9/2021 | Knight | G06F 16/9538 |

FOREIGN PATENT DOCUMENTS

| JP | 2002031455 A | 1/2002 |
| JP | 2002288351 A | 10/2002 |
| JP | 2003022305 A | 1/2003 |
| JP | 2004005590 A | 1/2004 |
| JP | 2004086684 A | 3/2004 |
| JP | 2005242495 A | 9/2005 |
| JP | 2005276171 A | 10/2005 |
| JP | 2010055489 A | 3/2010 |
| JP | 2011008747 A | 1/2011 |
| JP | 2017199296 A | 11/2017 |
| JP | 6310135 B1 | 3/2018 |
| JP | 2019502220 A | 1/2019 |
| JP | 6591115 B1 | 9/2019 |
| JP | 2019200623 A | 11/2019 |
| KR | 20190117436 A | 10/2019 |

OTHER PUBLICATIONS

International Search Report (ISR) (and English language translation thereof) dated Jun. 29, 2021, issued in International Application No. PCT/JP2021/013667.

Written Opinion dated Jun. 29, 2021, issued in International Application No. PCT/JP2021/013667.

Extended European Search Report (EESR) dated Mar. 7, 2024, issued in counterpart European Application No. 21779544.2.

* cited by examiner

FIG. 7

| USER ID | ADDRESS INFORMATION | TASTE PREFERENCE INFORMATION |
|---|---|---|
| #001 | AAA@BBB.com | STRONG |
| #002 | ... | NORMAL |
| #003 | ... | LIGHT |
| ... | ... | ... |

FIG. 8

| DESIGNATED DATE AND TIME INFORMATION | DESIGNATED SPACE INFORMATION |
|---|---|
| 2020/10/1 12:00 | MEETING ROOM A |
| 2020/10/2 12:30 | MEETING ROOM A |
| 2020/10/3 12:00 | MEETING ROOM A |
| 2020/10/4 12:00 | MEETING ROOM A |
| 2020/10/5 12:00 | MEETING ROOM B |
| 2020/10/5 17:30 | MEETING ROOM A |
| 2020/10/6 08:00 | RENTAL SPACE A |
| 2020/10/6 12:00 | MEETING ROOM A |
| 2020/10/7 12:00 | MEETING ROOM A |
| 2020/10/7 11:30 | MEETING ROOM B |

FIG. 10

| SELECTED DATE AND TIME INFORMATION | SELECTED SPACE INFORMATION | SELECTED DISH INFORMATION | AMOUNT INFORMATION | CONTENT INFORMATION |
|---|---|---|---|---|
| 2020/10/1 12:00 | MEETING ROOM A | #1 | FOR 1 PERSON | #1 |
| 2020/10/2 12:30 | MEETING ROOM A | #2 | FOR 2 PEOPLE | #2 |
| 2020/10/5 17:30 | WORKING ROOM A | #3 | FOR 1 PERSON | #3 |
| 2020/10/6 08:00 | RENTAL SPACE A | #4 | FOR 1.5 PEOPLE | #4 |
| 2020/10/7 11:30 | MEETING ROOM B | #5 | FOR 2 PEOPLE | #5 |
| ... | ... | ... | ... | ... |

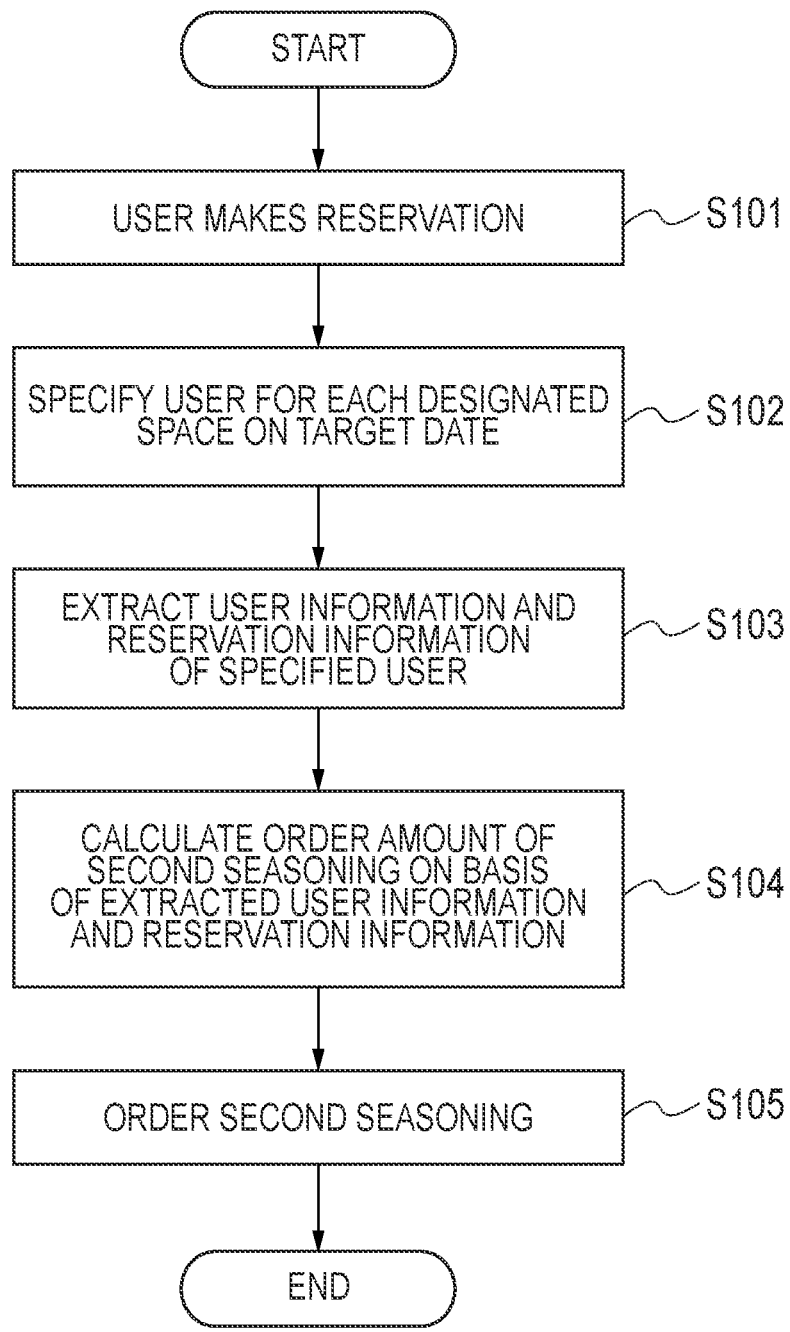

FIG. 12

COOKING RECIPE

■ BASE RECIPE

| | NAME | STIR-FRIED PORK AND CABBAGE WITH MISO |
|---|---|---|
| RECIPE 1 (BASE RECIPE) | INGREDIENTS | INGREDIENTS (FOR 2 PEOPLE)<br>200 g SLICED PORK LOINS (CUT INTO BITE-SIZED PIECES WITH SCISSORS)<br>220 g CUT VEGETABLES<br>2 TABLESPOONS OF WATER<br><MISO-BASED SAUCE (COMMON SEASONING)><br>1 TABLESPOON OF MISO<br>1 TABLESPOON OF SUGAR<br>2 TEASPOONS OF SOY SAUCE<br>1 TEASPOON OF GINGER (GRATED GINGER OR TUBE GINGER MAY BE USED)<br>1 TEASPOON OF STARCH<br><OPTIONAL SEASONING><br>1/2 TEASPOONS OF DOUBANJIANG MISO-BASED SAUCE |

| HOW TO COOK | 1 | 2 | 3 | 4 |
|---|---|---|---|---|
| | PUT OIL IN PLASTIC BAG AND RUB 1/2 OF MISO-BASED SAUCE INTO PORK | PUT OIL IN FLYING PAN, HEAT OIL, AND STIR-FRY MEAT | AFTER COOKING MEAT, PUT AND STIR-FRY VEGETABLES, ADD 2 TABLESPOONS OF WATER, AND PUT LID ON FRYING PAN TO SMOTHER IT FOR 7 MINUTES. SERVE DISHES | ADD REMAINING 1/2 OF MISO-BASED SAUCE AND MIX WHOLE WELL |
| | 5 | 6 | 7 | 8 |

■ SEASONING OPTIONS

| FIRST IN RECOMMENDED ORDER | COMMON SEASONING: IN #4 OF HOW TO COOK, CHANGE TO 1/4 OF MISO-BASED SAUCE * (LIGHT TASTE) |
|---|---|
| SECOND IN RECOMMENDED ORDER | COMMON SEASONING: IN #4 OF HOW TO COOK, ADD MORE MISO-BASED SAUCE (OPTIONAL SEASONING) * (STRONG TASTE) |
| THIRD IN RECOMMENDED ORDER | COMMON SEASONING: IN #4, ADD MORE DOUBANJIANG (OPTIONAL SEASONING) * (SPICY TASTE) |

FIG. 15

| USER ID | ADDRESS INFORMATION | PROFILE INFORMATION |
|---------|---------------------|---------------------|
| #001 | AAA@BBB.com | ... |
| #002 | ... | ... |
| #003 | ... | ... |
| ... | ... | ... |

FIG. 16A

| MAIN DISH | COOKING UTENSIL (FIRST COOKING UTENSIL) | COOKING TIME (FIRST COOKING TIME) |
|---|---|---|
| STIR-FRIED PORK AND CABBAGE WITH MISO | IH | 10 MINUTES |
| STIR-FRIED PORK WITH BARBECUE SAUCE | IH | 8 MINUTES |

FIG. 16B

| SIDE DISH | COOKING UTENSIL (SECOND COOKING UTENSIL) | COOKING TIME (SECOND COOKING TIME) |
|---|---|---|
| TURNIP TOSSED WITH PLUM AND KATSUOBUSHI | NONE | 5 MINUTES |
| PUMPKIN AND COTTAGE CHEESE SALAD | MICROWAVE OVEN | 6 MINUTES |
| FRIED ASPARAGUS AND THICK-SLICED BACON WITH BUTTER AND SOY SAUCE | IH | 5 MINUTES |
| BOILED JAPANESE MUSTARD SPINACH AND DEEP-FRIED TOFU | IH | 10 MINUTES |

FIG. 18

| SELECTED DATE AND TIME INFORMATION | SELECTED SPACE INFORMATION | SELECTED DISH INFORMATION (MAIN DISH) | SELECTED DISH INFORMATION (SIDE DISH) | CONTENT INFORMATION |
|---|---|---|---|---|
| 2020/10/1 12:00 | MEETING ROOM A | #1 | #A | #1 |
| 2020/10/2 12:30 | MEETING ROOM A | #2 | #B | #2 |
| 2020/10/5 17:30 | WORKING ROOM A | #3 | #C | #3 |
| 2020/10/6 08:00 | RENTAL SPACE A | #4 | #D | #4 |
| 2020/10/7 11:30 | MEETING ROOM B | #5 | #E | #5 |
| ... | ... | ... | ... | ... |

FIG. 21

| DESIGNATED DATE AND TIME INFORMATION | DESIGNATED SPACE INFORMATION | PROVIDING PLACE INFORMATION | | | |
|---|---|---|---|---|---|
| | | CONSTRAINT INFORMATION | | | ... |
| | | COOLING SPACE INFORMATION | ... | STORAGE INFORMATION | SIZE INFORMATION |
| | | | | ... | ... |
| 2020/10/1 12:00 | MEETING ROOM A | | | | |
| 2020/10/2 12:30 | MEETING ROOM A | | | | |
| 2020/10/3 12:00 | MEETING ROOM A | | | | |
| 2020/10/4 12:00 | MEETING ROOM A | | | | |
| 2020/10/5 12:00 | MEETING ROOM B | | | | |
| 2020/10/5 17:30 | MEETING ROOM A | | | | |
| 2020/10/6 08:00 | RENTAL SPACE A | | | | |
| 2020/10/6 12:00 | MEETING ROOM A | | | | |
| 2020/10/7 12:00 | MEETING ROOM A | | | | |
| 2020/10/7 11:30 | MEETING ROOM B | | | | |

FIG. 24

| DESIGNATED DATE AND TIME INFORMATION | DESIGNATED SPACE INFORMATION | PROVIDING PLACE INFORMATION | | | |
|---|---|---|---|---|---|
| | | CONSTRAINT INFORMATION | STORAGE INFORMATION | SIZE | ... |
| | | ODOR INFORMATION | ... | ... | |
| 2020/10/1 12:00 | MEETING ROOM A | ○ | | | |
| 2020/10/2 12:30 | MEETING ROOM A | ○ | | | |
| 2020/10/3 12:00 | MEETING ROOM A | ○ | | | |
| 2020/10/4 12:00 | MEETING ROOM A | ○ | | | |
| 2020/10/5 12:00 | MEETING ROOM B | × | | | |
| 2020/10/5 17:30 | MEETING ROOM A | × | | | |
| 2020/10/6 08:00 | RENTAL SPACE A | ○ | | | |
| 2020/10/6 12:00 | MEETING ROOM A | ○ | | | |
| 2020/10/7 12:00 | MEETING ROOM A | ○ | | | |
| 2020/10/7 11:30 | MEETING ROOM B | ○ | | | |

MANAGEMENT SERVER

CROSS-REFERENCE TO RELATED APPLICATIONS

The present application is a continuation based on PCT Application No. PCT/JP2021/013667, filed on Mar. 30, 2021, which claims the benefit of Japanese patent applications Nos. 2020-063746 filed on Mar. 31, 2020; 2020-164096 filed on Sep. 29, 2020; 2020-164101 filed on Sep. 29, 2020; 2020-164102 filed on Sep. 29, 2020; 2020-164104 filed on Sep. 29, 2020; and 2020-164105 filed on Sep. 29, 2020. The content of all of which are incorporated by reference herein in their entirety.

TECHNICAL FIELD

The present invention relates to a management server.

BACKGROUND ART

Conventionally, a system that provides a cooking recipe to a user is known (see, for example, JP-A 2019-200623 and JP-B 6591115).

Conventionally, a system that delivers ingredients and seasonings for cooking to a user's home or the like is known (see, for example, JP-A H9-274629 and JP-A 2010-055489).

Conventionally, a system that provides a cooking recipe to a user via a communication network is known (see, for example, JP-A 2002-288351, JP-A 2017-199296, JP-A 2004-086684, and JP-A 2003-022305).

SUMMARY OF INVENTION

In general, double-income households have the problem that it is difficult to take time to make a dish slowly. Therefore, when the above-described system ingredients provide a recipe for a dish and seasonings for making the dish delivered by the above-described system to a home, such a problem cannot be fundamentally solved.

In order to solve such a problem, it is conceivable to utilize a home-delivered meal, home-meal replacement, or the like, but there is a problem that it is challenging to continue to utilize them because they lead to high cost, and frequent utilization leads to feelings of guilt, and the taste becomes boring.

Therefore, the present disclosure has given the above-described problems, and the object of the present disclosure is to provide a management server capable of fundamentally solving the above-described problems of double-income households.

The first aspect of the present invention is summarized as a management server used in a service providing system that provides a service that enables a user to make a dish in a selected date and time and a selected space selected by the user from among a designated date and time and a designated space designated by a company, the management server including: a user information management unit that manages user information including confirmation information of the user; a company information management unit that manages company information including information regarding the designated space; a recipe determination unit that determines a recipe of the dish on the basis of the user information and the company information; an ordering unit that orders at least one of an ingredient and a seasoning necessary for making the dish on the basis of the recipe; and a content management unit that manages content related to the recipe to be provided to the user, wherein the confirmation information of the user includes information indicating the selected space and the selected date and time, and the information regarding the designated space includes constraint information regarding use of the space.

The second aspect of the present invention is summarized as a management server used in a service providing system that provides a service that enables a user to make a dish in a selected date and time and a selected space selected by the user from among a designated date and time and a designated space designated by a company, the management server including: a user information management unit configured to manage, for each of the users, user information including taste preference information indicating a taste preference; a reservation information management unit configured to manage, for each of the users, reservation information associating selected date and time information indicating the selected date and time, selected space information indicating the selected space, selected dish information indicating the dish selected by the user, content identification information for identifying content corresponding to a recipe of the dish, and amount information indicating an amount of the dish; an order placement unit configured to order a first seasoning and a second seasoning together with an ingredient of the dish; and a content distribution unit configured to distribute the content associated with the selected date and time to the user before the selected date and time, wherein the order placement unit is configured to determine, for each of the users, an order amount of the second seasoning for each user on the basis of the taste preference information, the selected dish information, and the amount information, the first seasoning is a seasoning managed in stock in the designated space and shared by a plurality of the users, and the second seasoning is a seasoning that is not managed as stock in the designated space and is individually used for cooking the dish for each of the users.

The third aspect of the present invention is summarized as a management server used in a service providing system that provides a service that enables a user to make a dish in a selected date and time and a selected space selected by the user from among a designated date and time and a designated space designated by a company, the management server including: a user information management unit configured to manage, for each of the users, user information including taste preference information indicating a taste preference; a reservation information management unit configured to manage, for each of the users, reservation information associating selected date and time information indicating the selected date and time, selected space information indicating the selected space, selected dish information indicating the dish selected by the user, content identification information for identifying content corresponding to a recipe of the dish, and amount information indicating an amount of the dish; and a content distribution unit configured to distribute the content associated with the selected date and time to the user before the selected date and time, wherein the content distribution unit is configured to generate and distribute the content in which description of an amount of at least one of an ingredient or a seasoning in the recipe is changed for each of the users on the basis of the taste preference information, the content information, and the amount information.

The fourth aspect of the present invention is summarized as a management server used in a service providing system that provides a service that enables a user to make a dish in a selected date and time and a selected space selected by the user from among a designated date and time and a designated space designated by a company, the management server including: a cooking utensil information management unit configured to manage cooking utensil information associating a cooking utensil to be used to make the dish with a cooking time for using the cooking utensil; a dish proposal unit configured to determine a recommended dish for each of the users on the basis of the cooking utensil information; a user interface configured to notify the user of the recommended dish and receive a combination of dishes selected by the user from the recommended dish; a reservation information management unit configured to manage, for each of the users, reservation information associating selected date and time information indicating the selected date and time, selected space information indicating the selected space, selected dish information indicating a combination of the dishes, and content identification information identifying content corresponding to a recipe of the selected dish; and a content distribution unit configured to distribute, to the user, the content associated with the selected date and time before the selected date and time.

The fifth aspect of the present invention is summarized as a management server used in a service providing system that provides a service that enables a user to make a dish in a selected date and time and a selected space selected by the user from among a designated date and time and a designated space designated by a company, the management server including: a reservation information management unit configured to manage, for each of the users, reservation information associating selected date and time information indicating the selected date and time, selected space information indicating the selected space, and selected dish information indicating the dish selected by the user; and a company information management unit configured to manage company information associating designated date and time information indicating the designated date and time, designated space information indicating the designated space, and constraint information regarding use of the designated space; a determination unit configured to determine, on the basis of the reservation information and the company information, the number of available users indicating the number of remaining users who can make the dish in the designated space at the designated date and time or an available amount indicating a remaining amount sufficient to be able to make the dish in the designated space at the designated date and time; and a user interface configured to notify the user of the number of available users or the available amount.

The sixth aspect of the present invention is summarized as a management server used in a service providing system that provides a service that enables a user to make a dish in a selected date and time and a selected space selected by the user from among a designated date and time and a designated space designated by a company, the management server including: a reservation information management unit configured to generate and manage, for each of the users, reservation information associating selected date and time information indicating the selected date and time, selected space information indicating the selected space, and selected dish information indicating the dish selected by the user according to a reservation of the service by the user; a company information management unit configured to manage company information associating designated date and time information indicating the designated date and time, designated space information indicating the designated space, and constraint information regarding use of the designated space; a determination unit configured to determine, on the basis of the constraint information, a type of the dish that can be made in the designated space at the designated date and time with reference to the company information management unit; and a user interface configured to limit a type of the dish selectable by the user in the designated space at the designated date and time on a user reservation screen on the basis of the type of the dish determined by the determination unit.

Advantageous Effects of Invention

According to the present invention, it is possible to provide a management server capable of fundamentally solving the above-described problems of double-income households.

BRIEF DESCRIPTION OF DRAWINGS

FIG. 7 illustrates an example of user information managed by a user information management unit 201 of the management server 100 according to the second and third embodiments.

FIG. 8 illustrates an example of company information managed by a company information management unit 202/302 of the management server 100 according to the second to fourth embodiments.

FIG. 10 illustrates an example of user information managed by a reservation information management unit 205/405 of the management server 100 according to the second, third, fifth, and sixth embodiments.

FIG. 11 is a flowchart illustrating an example of an operation of the management server 100 according to the second embodiment.

FIG. 12 illustrates an example of content corresponding to a recipe displayed on a terminal 20 by a content distribution unit 207 of the management server 100, according to the third embodiment.

FIG. 15 illustrates an example of user information managed by a user information management unit 301/402 of the management server 100 according to the fourth to sixth embodiments.

FIGS. 16A and 16B illustrate examples of cooking utensil information managed by a cooking utensil information management unit 309 of the management server 100 according to the fourth embodiment.

FIG. 18 illustrates an example of user information managed by a reservation information management unit 305 of the management server 100 according to the fourth embodiment.

FIG. 21 illustrates an example of company information managed by a company information management unit 403 of the management server 100 according to the fifth embodiment.

FIG. 24 illustrates an example of company information managed by a company information management unit 403 of the management server 100 according to the sixth embodiment.

DESCRIPTION OF EMBODIMENTS

Figure 1:
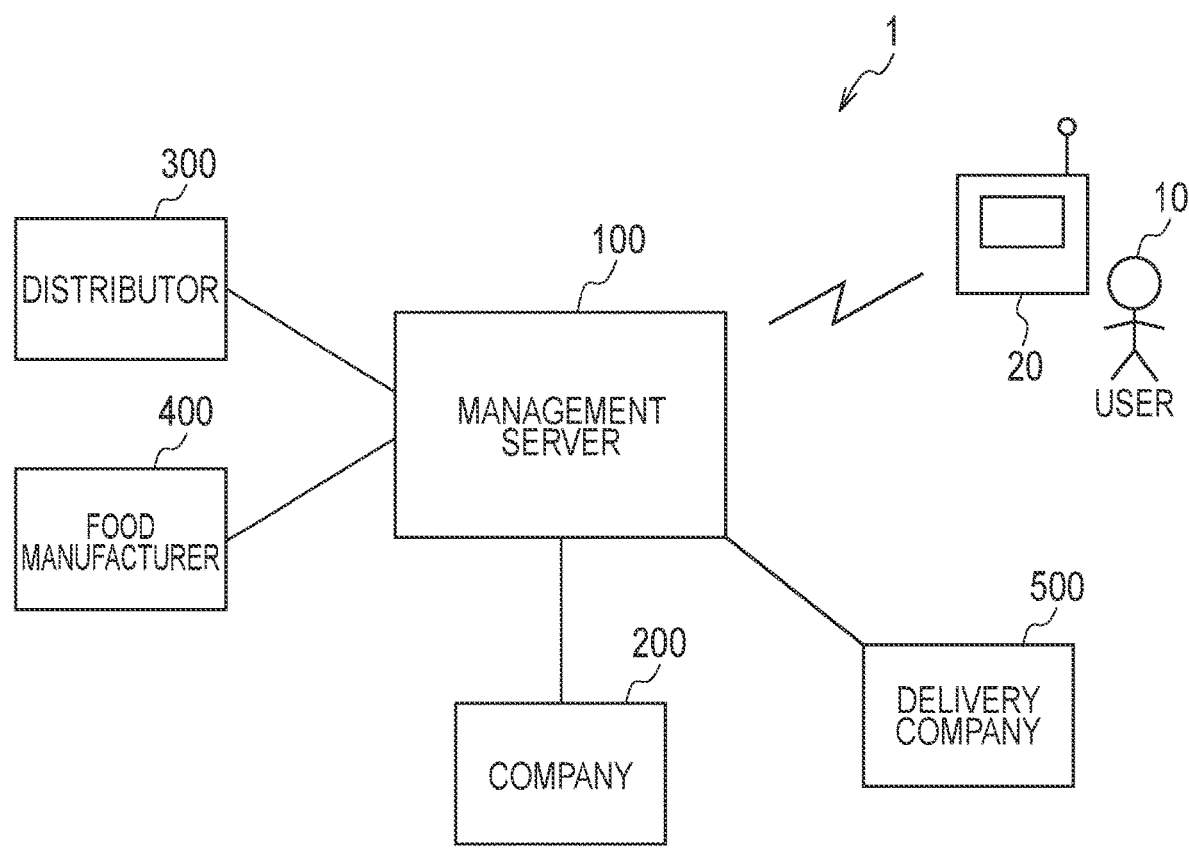
FIG. 1 shows an example of an overall schematic configuration of a service-providing system 1 according to the first to sixth embodiments.

From now on, embodiments of the present invention will describe in the drawings. Note that components in the following embodiments can replace existing components or the like, and various variations, including combinations with other existing components, are possible. Therefore, the following description of the embodiments does not limit the contents of the invention described in the claims.

First Embodiment

A first embodiment of the present invention will be described below regarding FIGS. 1 to 5.

An example of a configuration of a service-providing system 1 according to the present embodiment will describe in FIGS. 1 to 5.

The service providing system 1, according to the present embodiment, is configured to use a management server 100 to provide a service (from now on, present service) that enables a user 10 to make a dish on a date and time (after this, selected date and time) and a space (after this, selected space) selected by the user 10 from a date and time (after this, designated date and time) and a space (after this, designated space) designated by the company 200.

After this, in the present embodiment, the user 10 indicates a member subscribing to the current service. Furthermore, the current service may be, for example, a subscription-type service that can use with a fixed monthly fee.

In addition, the company 200 indicates a company that has agreed to provide the current service and can provide the above-described designated space. Note that, as long as the company 200 can provide the above-described designated space, the company 200 may be, for example, a company in which the user 10 works or a company that provides a type of rental space or the like permitted to use or rent temporarily.

Note that the company 200 in which the user 10 works may bear a part of the usage fee of the user 10 as a part of the benefits program.

Furthermore, the designated space indicates a place where the user 10 can cook, and may be, for example, a meeting room or a working room in an office of the company 200, a rental space provided by the company 200, or the like. Examples of the rental space include an event space, a co-working space, a space of a fitness gym, and the like.

Furthermore, the designated date and time is preferably a spare time during the moving time or working time of the user 10. For example, the spare time may include early morning, after hours, and a holiday.

That is, the user 10 can cook not only in a meeting room or a working room in an office of the company where the user 10 works, but also in a rental space or the like in periods excluding working hours and including holidays.

For example, the present service may be directed to the user 10, who works in the company 200, is a part of a double-income household, and has difficulty taking time to cook at home. In particular, the current service may be direct to a mother or father of a double-income parenting household.

As illustrated in FIG. 1, the service providing system 1, according to the present embodiment, includes a terminal 20, the management server 100, the company 200, a distributor 300, a food manufacturer 400, and a delivery company 500.

The terminal 20 uses by the user 10 a member of the current service provided by the service providing system 1 according to the present embodiment. For example, the terminal 20 may be a personal computer (PC) of the user 10 or a portable communication terminal of the user 10.

The company 200 can manage reservation information or the like of a meeting room or the like of the company 200 by, for example, a server or the like. Furthermore, in response to a request (see FIG. 5) from the management server 100, the company 200 can determine a designated space and a designated date and time that can provide to the user 10 regarding the reservation information of the meeting room or the like, and can notify the management server 100 of the space and the date and time.

The distributor 300 may accept an order for ingredients necessary to make the aforementioned dish and provide the ingredients. For example, the distributor 300 may be a food distributor or the producer itself. Furthermore, the distributor 300 may receive the order from a server.

Here, the distributor 300 may periodically provide ingredients at a predetermined time in response to a request from the management server 100.

The food manufacturer 400 may accept an order of seasoning necessary to make the dish and provide the seasoning or the like. The food manufacturer 400 may accept the order by a server or the like. Here, the food manufacturer 400 may periodically provide seasoning or the like at a predetermined timing in response to a request from the management server 100.

When receiving a delivery request from the management server 100, the delivery company 500 can deliver the above-described dish to an address (for example, the home or the like of the user 10) designated by the user 10.

The management server 100 is a server that enables the user 10 to make the dish on the selected date and time and the selected space selected by the user 10 from among the designated date and time and the designated space designated by the company 200.

Figure 2:
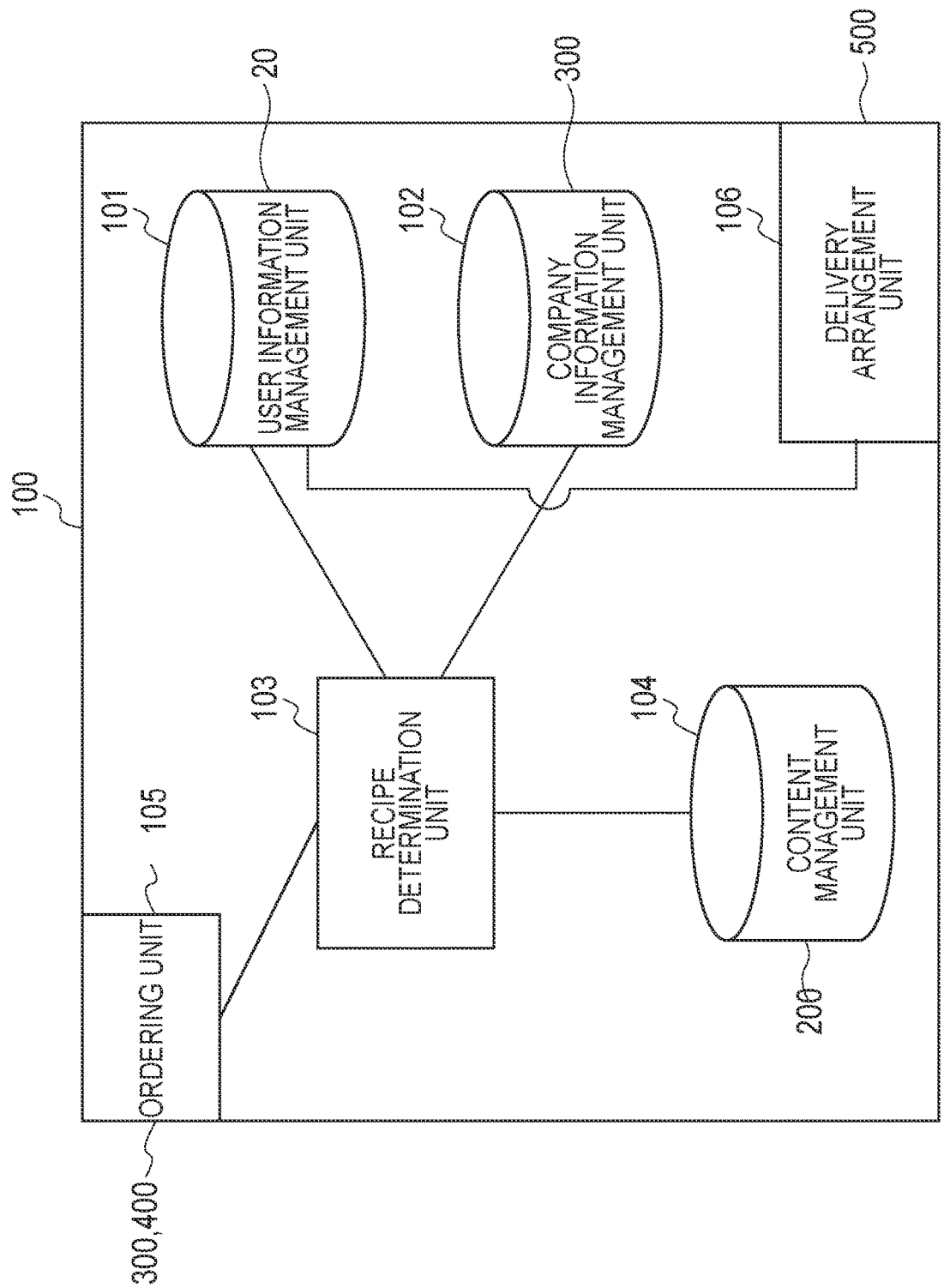
FIG. 2 illustrates an example of functional blocks of a management server 100 according to the first embodiment.

As illustrated in FIG. 2, the management server 100 includes a user information management unit 101, a company information management unit 102, a recipe determination unit 103, a content management unit 104, an ordering unit 105, and a delivery arrangement unit 106.

The user information management unit 101 is configured to manage user information related to the user 10 registered as a member of the current service. Here, the user information management unit 101 is configured to generate the user information of the user 10 based on information input by the terminal 20 of the user 10.

Figure 3:
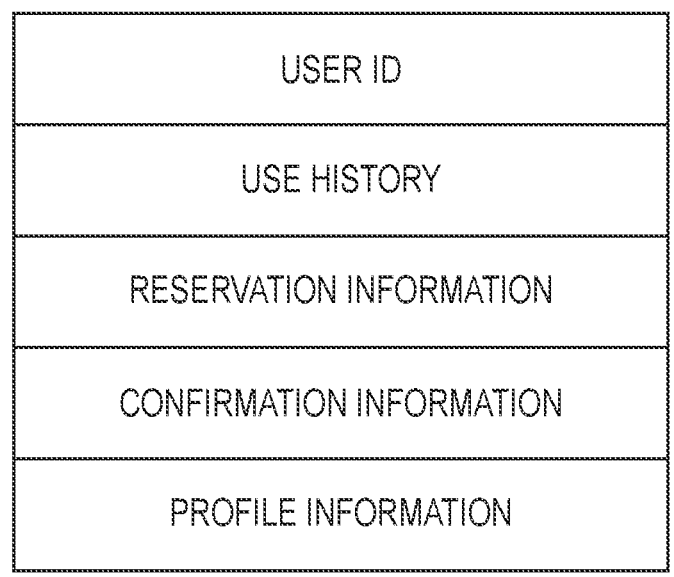
FIG. 3 illustrates an example of user information managed by a user information management unit 101 of the management server 100 according to the first embodiment.

For example, as illustrated in FIG. 3, the user information includes a "user ID", a "use history", "reservation information", "confirmation information", "profile information", and the like.

Here, the "user ID" is information for identifying the user.

The "use history" is information related to a use history of the current service by the user 10. For example, the "user history" includes information such as the date and time when the user 10 used the current service, contents of the dish made at that time, a recipe of the dish made at that time, and the like.

The "reservation information" is information related to the reservation of the present service by the user 10. The "reservation information" is generated based on a reservation made by the user 10 using the terminal 20 (see FIG. 5).

For example, the "reservation information" includes information indicating a date and time (for example, available time zone or the like) when the user 10 wishes to use the current service, information indicating a space (a meeting room, an office room, a rental space, or the like) of the company 200 where the user 10 wishes to use the current service, information (information regarding the necessity of delivery) indicating whether or not the user wishes the dish made at that time to deliver to the user 10, and the like.

The "reservation information" may be deleted after the "confirmation information" described later is generated.

The "confirmation information" is related to the confirmed reservation of the present service by the user 10. The "confirmation information" is generated based on the designated space and the designated date and time notified by the company 200.

For example, the "confirmation information" includes information indicating the designated space (a space where the user 10 makes the dish at the time of using the current service) provided by the company 200, information indicating the designated date and time (a date and time when the user 10 makes the dish at the time of using the current service) designated by the company 200, information (information related to the necessity of delivery) indicating whether or not to deliver the dish made at that time, and the like.

Note that the user information management unit 101 may not manage the "reservation information" and may cause the "confirmation information" to have a role in the "reservation information".

In such a case, the user information management unit 101 generates "confirmation information", including information regarding a date and time (selected date and time) when the user 10 desires to use the current service, a space (selected space) of the company 200 where the user 10 desires to use the present service, information related to the necessity of the delivery, and the like based on the reservation made by the user 10 using the terminal 20.

After that, based on the space and the date and time notified by the company 200, the user information management unit 101 updates the information indicating the date and time (selected date and time) when the user 10 wishes to use the current service and the information indicating the space (selected space) of the company 200 where the user 10 wishes to use the present service to information indicating the designated space provided by the company 200 and information indicating the designated date and time designated by the company 200, respectively.

The "profile information" is information related to the user's profile 10. For example, the "profile information" includes the date of birth, gender, family structure, food preferences, allergy information, and the presence or absence of a medical history of the user 10, the company in which the user 10 works, and use plan information and the like of the user 10.

Here, the use plan information is a budget, selection of a scene (a case of eating the dish in the office, a case of carrying the dish home and eating it at home, or both cases) of eating the dish, information designating a menu intention, and the like. Note that the menu intention is information indicating a plan prepared for each user's purpose 10. For example, the menu intention includes a meal prep plan assuming freezing or the like, a plan for children (for example, for a person who wants to cook baby food, infant food, or the like), a standard dish plan (for those who emphasize the balance of the entire menu, and the like), a health plan (for those who intend to diet, and the like), and the like.

The company information management unit 102 is configured to manage company information that is information related to the company 200 that agrees to provide the current service.

Figure 4:
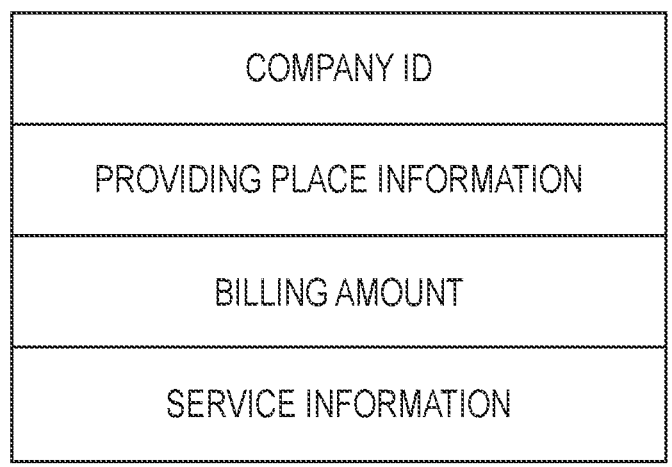
FIG. 4 illustrates an example of company information managed by a company information management unit 102 of the management server 100 according to the first embodiment.

For example, the company information includes a "company ID" and "providing place information", as illustrated in FIG. 4. Here, the "company ID" is information for identifying the company 200.

The "providing place information" is information regarding the designated space (a meeting room, an office room, a rental space, or the like) of the company 200 that provides the current service. For example, the "providing place information" includes information indicating the size of the designated space of the company 200, storage information, constraint information, and the like.

Here, the storage information is information regarding ingredients, seasonings, and the like, cooking utensils, and the like stored for the designated space of the company 200.

Furthermore, the constraint information is constraint information regarding the use of the designated space of the company 200. It includes constraint information regarding equipment in the designated space of the company 200, constraint information regarding environment maintenance of the designated space of the company 200, constraint information regarding the maintenance of cooking utensils for cooking in the designated space of the company 200, and the like.

For example, the constraint information regarding the equipment in the designated space of the company 200 includes limitations regarding the availability of each equipment for electricity, water, gas, ventilation, and the like and usage of each equipment, and the like in the designated space of the company 200.

Furthermore, for example, the constraint information regarding the environment maintenance of the designated space of the company 200 includes a limitation (for example, a limitation on the environment of the designated space in which it is not preferable that an aroma derived from an ingredient or a dish remains, and the like) regarding the environment maintenance of the designated space after cooking.

Furthermore, for example, the constraint information regarding the maintenance of the cooking utensils for cooking in the designated space of the company 200 includes a limitation regarding maintenance such as cleaning of the cooking utensils (for example, a limitation on ingredients and dishes that are difficult to wash, and the like).

Note that the "providing place information" may include information indicating a date and time when the designated space of the company 200 is available. For example, the information is generated on the basis of information notified by the company 200 at a predetermined timing. In a case where the information is included in the "provision place information", the user information management unit 101 may generate the above-described "confirmation information" on the basis of the information without requesting the company 200.

In addition, as illustrated in FIG. 4, the company information may include a "billing amount" and "service information".

The "billing amount" is information indicating the amount borne by the company 200 out of the usage fee for the user 10 who works in the company 200 to use the present service. Here, in a case where the company 200 is a company that provides a rental space or the like, or in a case where the company 200 does not bear a part of the usage fee of the user 10 working in the company 200, the company information management unit 102 may not include the "billing amount" in the company information, may not set a value to the "billing amount", or may set the "billing amount" to 0 yen.

The "service information" is information indicating a usage plan that may be used by the user 10, who works in the company 200. Here, in a case where the company 200 is a company that provides a rental space or the like, or in a case where the company 200 does not bear a part of the usage fee of the user 10 working in the company 200, the company information management unit 102 may not include the "service information" in the company information or may not set a value to the "service information".

The recipe determination unit 103 is configured to determine a recipe of a dish for each user 10 on the basis of the user information managed by the user information management unit 101 and the company information managed by the company information management unit 102.

For example, the recipe determination unit 103 may be configured to determine a recipe for the user 10 on the basis of the past use record of the user 10, the constraint information of the space of the company 200 in which the user 10 works, the available use plan, and the like, such as the family structure and the allergy information of the user 10.

Here, the recipe determination unit 103 may be configured to create a recipe for a predetermined period (for example, one month or one week) for each user 10.

In addition, such a recipe is preferably a recipe for a dish that can be made in spare time, such as early morning, after hours, or at lunchtime. For example, such a recipe is preferably a recipe for a dish that can be made in a predetermined time (for example, 10 minutes to 20 minutes).

Furthermore, the recipe determination unit 103 may be configured to generate the same recipe for a group including a plurality of users 10 at the same date and time (time zone) in the same space. In such a case, the recipe determination unit 103 may be configured to determine the recipe on the basis of the number of users in the group.

The content management unit 104 is configured to manage content related to each recipe. Here, the content may be a moving image or audio indicating how to make a dish corresponding to each recipe or may include a text, a photograph, an image, a picture, or the like describing how to make such a dish.

Note that the content management unit 104 may be configured to manage content acquired from the outside or may be configured to manage content input by an administrator.

The ordering unit 105 is configured to order at least one of the ingredients and seasoning necessary for making a dish corresponding to such a recipe on the basis of the recipe of each user 10 determined by the recipe determination unit 103.

For example, the ordering unit 105 may be configured to order such ingredients, seasonings, and the like in consideration of the storage information and constraint information of the space (selected space) of the company 200 in which each user 10 desires to use the present service.

Here, the ordering unit 105 may be configured to order, from the distributor 300, ingredients required to make a dish corresponding to the recipe determined by the recipe determining unit 103 for an amount insufficient as stock in the designated space of the target company 200.

Similarly, the ordering unit 105 may be configured to order, from the food manufacturer 400, seasoning or the like necessary for making the dish corresponding to the recipe determined by the recipe determination unit 103 for an amount insufficient as stock in the designated space of the target company 200.

Such an order may be placed by e-mail or FAX via a network, may be placed in the form of input to a prescribed format in a server or the like managed by the distributor 300 or the food manufacturer 400, or may be placed by voice call.

Note that, in the service providing system 1 according to the present embodiment, a case where a group including a plurality of users 10 makes a dish with the same recipe at the same designated date and time (time zone) in a designated space of a certain company 200 is also assumed. In such a case, the amounts of ingredients, seasoning, and the like to be ordered are determined on the basis of the number of users in the group. Therefore, in such a case, the ordering unit 105 may be configured to place the above-described order on the basis of the number of users in the group.

The delivery arrangement unit 106 is configured to arrange delivery of a dish made by the user 10 on the basis of information regarding the necessity of delivery and included in the user information managed by the user information management unit 101.

Such a delivery request may be made by electronic mail or FAX via a network, may be made in the form of input to a prescribed format in a server or the like managed by the delivery company 500, or may be made by voice call.

An example of an operation of the service providing system 1 according to the present embodiment will be described with reference to FIG. 5. Specifically, an operation to be performed on the assumption that the user 10 continuously uses the present service in the service providing system 1 according to the present embodiment will be described.

Figure 5:
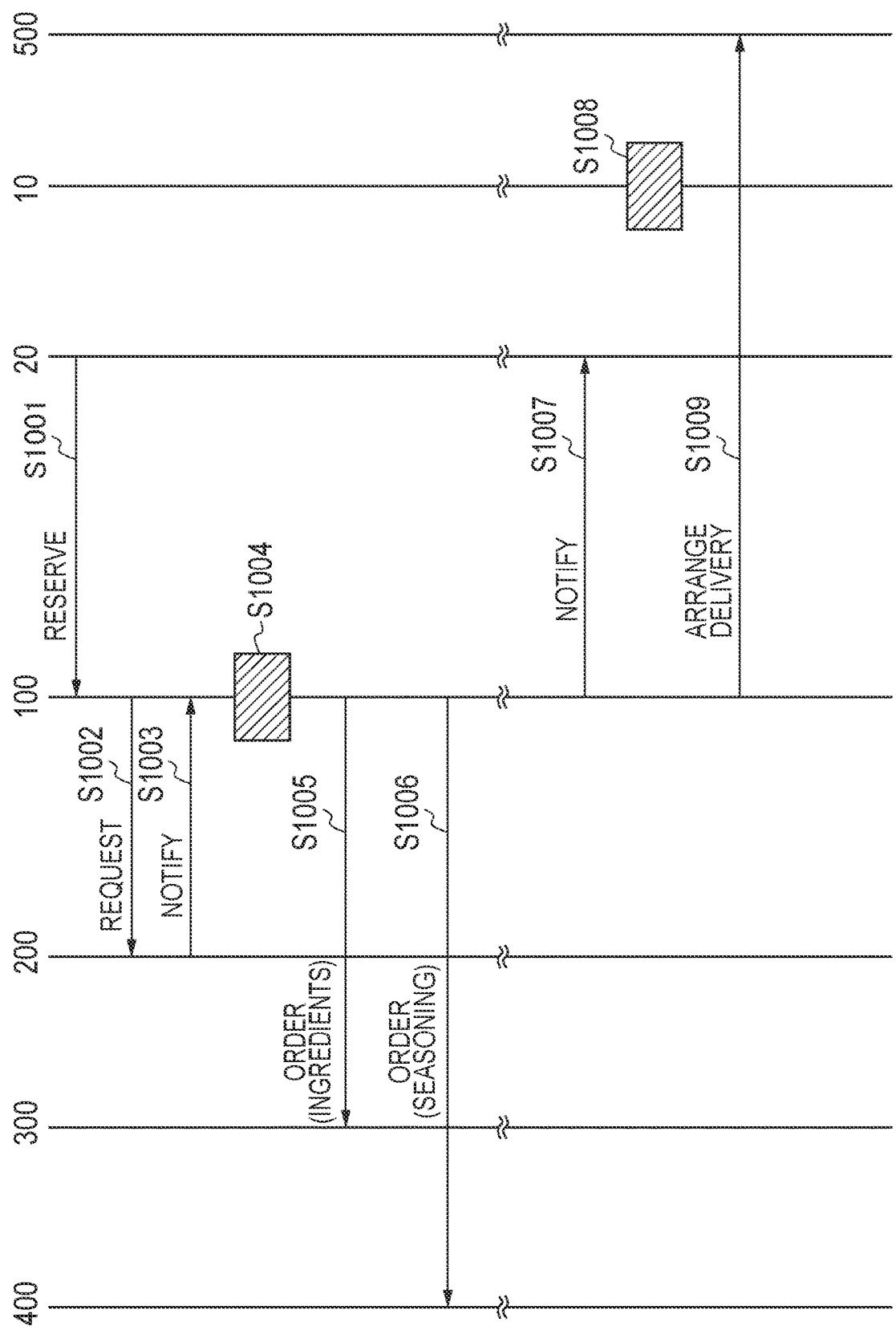
FIG. 5 is a sequence diagram illustrating an example of an operation of the service-providing system 1 according to the first embodiment.

As illustrated in FIG. 5, in step S1001, each user 10 uses a terminal 20 to reserve the present service for the management server 100. Specifically, the user 10 may reserve the present service by inputting predetermined information to a site for the present service in the management server 100 using the terminal 20, or may reserve the present service by transmitting an e-mail to the management server 100. In addition, the reservation may be made by FAX or voice call.

In addition, each user 10 uses a terminal 20 to make such a reservation by transmitting information such as information indicating a date and time (selected date and time) when the user wishes to use the present service, information indicating a space (selected space) of the company 200 in which the user wishes to use the present service, and information related to the necessity of delivery.

For example, each user 10 may collectively make a reservation for each predetermined period (for example, monthly or weekly).

In step S1002, the management server 100 requests the company 200 to use the space (selected space) of the company 200 in which each user 10 desires to use the present service at the date and time (selected date and time) when each user 10 desires to use the present service according to the reservation.

In step S1003, in response to the request, the company 200 confirms whether or not the space (selected space) of the company 200 in which each user 10 wishes to use the present service is available at the desired date and time when each user 10 wishes to use the present service.

When determining that the space is available, the company 200 notifies the management server 100 of the determination. On the other hand, in a case where the company 200 determines that it is not available, the company 200 notifies the management server 100 of information indicating an available designated space of the company 200 and a designated date and time.

In step S1004, the management server 100 determines a recipe of a dish to be made by each user 10 on the basis of the user information, the company information, and the like managed by the management server 100 itself.

In step S1005, the management server 100 orders the distributor 300 for ingredients necessary for making the dish corresponding to the recipe determined in step S1004, and in step S1006, the management server 100 orders the food manufacturer 400 for seasoning or the like necessary for making the dish corresponding to the recipe determined in step S1004.

In step S1007, the management server 100 notifies the terminal 20 of each user 10 of information indicating a date and time (e.g., a lunch time) and a space (e.g., a meeting room number) for using the present service, content related to the recipe of the dish to be made by the present service, and the like, and in step S1008, the user 10 makes a dish while watching the notified content in the notified selected space at the notified selected date and time. Here, each user 10 may view the content on the terminal 20 possessed by the user, or may view the content on a monitor, a terminal, or the like prepared by the company 200.

In step S1009, the management server 100 arranges for the delivery company 500 the delivery of the dish to the address designated by the user 10, who desires the delivery of the dish made in step S1008. On the other hand, the user 10 who does not desire delivery can bring such a dish to the home or the like by himself/herself. Note that the user 10 may eat the dish on the spot, at his/her seat, or the like without taking the dish home or the like.

According to the service providing system 1 according to the present embodiment, by renting a space of the company 200, it is possible to make a dish in a spare time during a moving time or a working time of the user 10, and moreover, a troublesome recipe is devised by the management server 100 as a substitute. Therefore, in a busy dual-income household (in particular, a double-income parenting household), it is possible to increase the time for communication (in particular, communication with children) between family members, and it is also possible to secure own time.

Furthermore, according to the service providing system 1 according to the present embodiment, tidying up after cooking in the space of the company 200 can be outsourced to an external company, be on duty among the users 10, or be performed by the user 10 who wishes to reduce the usage fee of the present service, thereby reducing the burden on each user 10.

In addition, according to the service providing system 1 according to the present embodiment, since the user 10 himself/herself can cook in the spare time during the moving time or working time of the user 10, it is possible to eliminate the guilt of not cooking by himself/herself while reducing the cost as compared with the case of using home-meal replacement or a home-delivered meal.

Furthermore, according to the service providing system 1, according to the present embodiment, the user 10 can cook without being conscious of the purchase of ingredients, seasonings, and the like, maintenance of cooking utensils, and tidying and cleaning of a kitchen after cooking at home.

Second Embodiment

A second embodiment of the present invention will be described below, focusing on differences from the above-described first embodiment with reference to FIGS. 1 and 6 to 11.

A service providing system 1 according to the present embodiment is configured to use a management server 100 to provide a service (hereinafter, present service) that enables a user 10 to make a dish on a date and time (hereinafter, selected date and time) and a space (hereinafter, selected space) selected by the user 10 from a date and time (hereinafter, designated date and time) designated by a company 200 and a space (hereinafter, designated space) designated by the company 200.

Hereinafter, in the present embodiment, the user 10 indicates a member who subscribes to the present service. Furthermore, the present service may be, for example, a subscription type service that can be used with a fixed monthly usage fee or it may be a type of service for which a usage fee is paid each time the user 10 uses the present service.

For subscription to the present service, the user 10 determines a plan suitable for the user himself/herself from among plans for which the number of times the user can cook by using the present service during a predetermined period (for example, on a weekly or monthly basis) is determined. Note that the user 10 can change his/her plan after subscribing to the present service.

In addition, the company 200 indicates a company that has agreed to provide the present service and can provide the above-described space. Note that, as long as the company 200 can provide the above-described space, the company 200 may be, for example, a company in which the user 10 works, or a company that provides a type of rental space or the like permitted to be temporarily used or rent.

Note that the company 200 in which the user 10 works may bear a part or all of the usage fee of the user 10 as a part of the benefits program.

Furthermore, the designated space (and the selected space) indicates a place where the user 10 can cook, and may be, for example, a meeting room or a working room in an office of the company 200, a rental space provided by the company 200, or the like. Examples of the rental space include an event space, a co-working space, an empty space of a fitness gym, and the like.

Furthermore, the designated date and time (and a selected date and time) is preferably a spare time during the moving time or working time of the user 10. For example, the spare time may include a break time such as early morning and a lunch break, after hours, and a holiday.

That is, the user 10 can cook not only in a meeting room or an office room in the office of the company 200 where the user 10 works, but also in a rental space or the like in time periods excluding working hours and including holidays.

For example, the present service may be directed to the user 10, who works in the company 200, is a part of a double-income household, and has difficulty taking time to cook at home. In particular, the present service may be directed to a mother or father of a double-income parenting household.

As illustrated in FIG. 1, the service providing system 1 according to the present embodiment includes a terminal 20, the management server 100, the company 200, a distributor 300, a food manufacturer 400, and a delivery company 500.

The terminal 20 is used by the user 10, who is a member of the present service provided by the service providing system 1 according to the present embodiment. For example, the terminal 20 may be a personal computer (PC) of the user 10 or a portable communication terminal of the user 10.

The company 200 can manage reservation information or the like of the meeting room or the like of the company 200 by, for example, a server or the like. In addition, in response to a request from the management server 100, the company 200 can determine a space and a date and time that can be provided to the user 10 with reference to the reservation status of the meeting room or the like and can notify the management server 100 of the space and the date and time as the above-described designated space and designated date and time.

The distributor 300 may accept an order for ingredients necessary to make the aforementioned dish and provide the ingredients. For example, the distributor 300 may be a food distributor or may be the producer itself. Furthermore, the distributor 300 may receive the order from a server or the like.

Here, the distributor 300 may periodically provide ingredients at a predetermined timing in response to a request from the management server 100.

The food manufacturer 400 may accept an order of seasoning necessary to make the dish and provide the seasoning or the like. The food manufacturer 400 may accept the order by a server or the like. Here, the food manufacturer 400 may periodically provide seasoning or the like at a predetermined timing in response to a request from the management server 100.

Note that the distributor 300 and the food manufacturer 400 may be the same business entity.

When receiving a delivery request from the management server 100, the delivery company 500 can deliver the above-described dish to an address (for example, the home or the like of the user 10) designated by the user 10.

The management server 100 is a server that enables the user 10 to make a dish on the selected date and time and the selected space selected by the user 10 from among the designated date and time and the designated space designated by the company 200.

Figure 6:
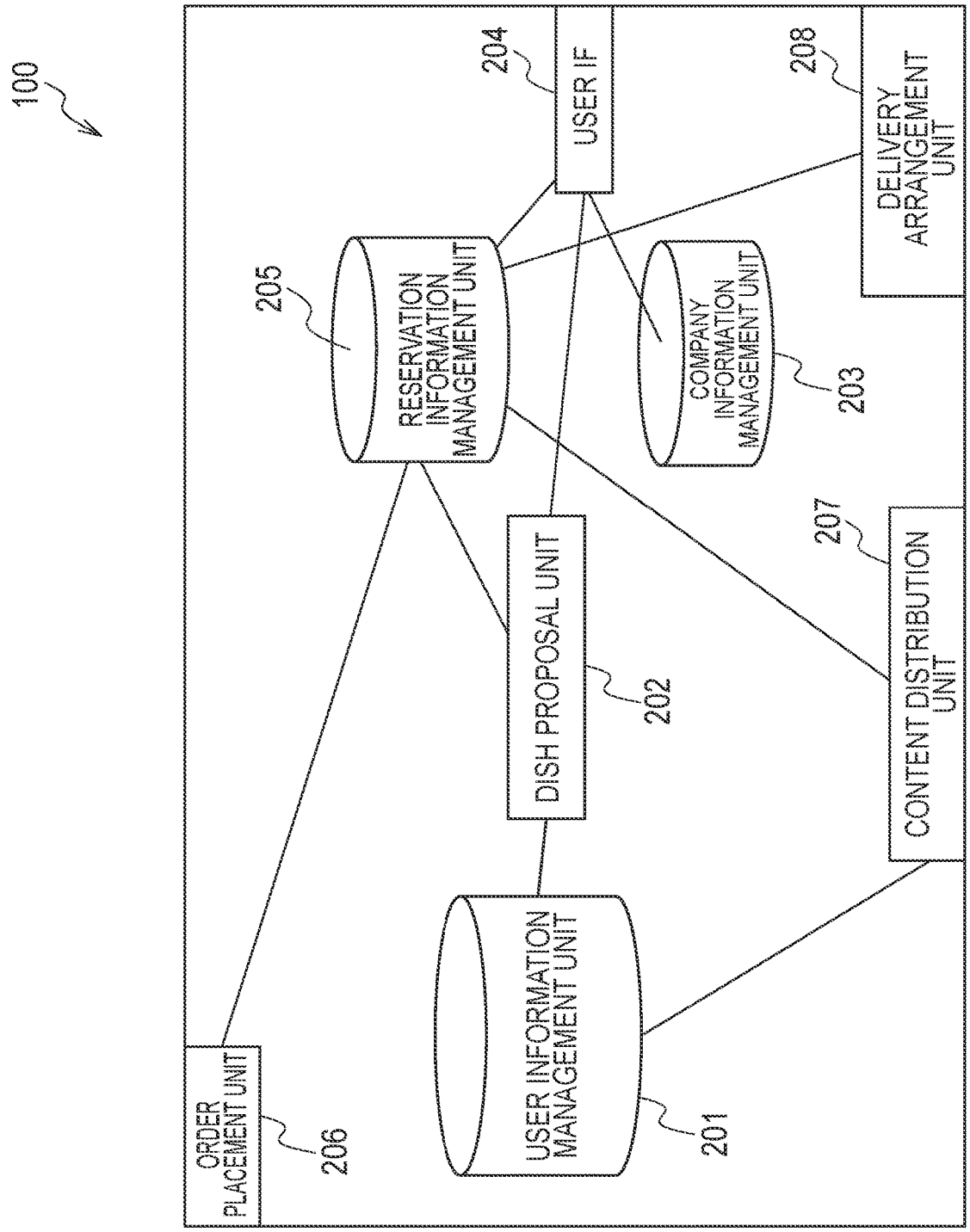
FIG. 6 illustrates an example of functional blocks of a management server 100 according to the second and third embodiments.

As illustrated in FIG. 6, the management server 100 includes a user information management unit 201, a dish proposal unit 202, a company information management unit 203, a user interface (IF) 204, a reservation information management unit 205, an order placement unit 206, a content distribution unit 207, and a delivery arrangement unit 208. Here, the management server 100 may not include the delivery arrangement unit 208.

The user information management unit 201 is configured to manage user information which is information related to the user 10 registered as a member of the present service. Here, the user information management unit 201 is configured to generate user information of each user 10 on the basis of information input by the terminal 20 of the user 10.

For example, as illustrated in FIG. 7, the user information management unit 201 is configured to manage, for each user 10, at least a "user ID", "address information", and "taste preference information" in association with each other as the user information.

Here, the "user ID" is information for identifying the user 10.

The "address information" is the address information of a transmission destination of content designated by the user 10. For example, as illustrated in FIG. 7, a mail address or the like of the terminal 20 of the user 10 may be set in the "address information".

The "taste preference information" is information indicating the taste preferences of the user 10. For example, as illustrated in FIG. 7, "strong" indicates that strong seasoning is preferred, "light" indicates that light seasoning is preferred, "normal" indicates that normal seasoning is preferred, and the like may be set in the "taste preference information". In addition, although not illustrated, "spicy taste" indicates that spicy seasoning is preferred, "sour" indicates that sour seasoning is preferred", "sweet taste" indicates that sweet seasoning is preferred, and "bitter taste" indicates that bitter seasoning is preferred, and the like may be set in the "taste preference information".

Note that, although not illustrated, the user information management unit 201 may be further configured to manage, as the user information, profile information that is information related to the profile of the user 10, a use history that is information related to a use history of the present service by the user 10, and the like.

For example, the date of birth, gender, family structure, food preferences, allergy information, and presence or absence of a medical history of the user 10, a company in which the user 10 works, a desired use form and the like of the user 10 may be set in the profile information.

Note that the above-described "taste preference information" may be included in the profile information.

Here, the desired use form and the like are information related to the use form that the user 10 desires to use. As the desired use form, information for designating a budget, selection of a scene of eating a dish (in the case of eating the dish in the office, in the case of taking the dish home and eating it, or in both cases), a menu intention, or the like may be set.

Note that the menu intention is information indicating a plan prepared for each purpose of the user 10. For example, in the menu intention, a meal prep plan assuming freezing or the like, a plan for children (for example, for a person who wants to cook baby food, infant food, or the like), a standard dish plan (for those who emphasize the balance of the entire menu, and the like), a health plan (for those who intend to diet, and the like), and the like may be set.

For example, in the "use history", information such as the date and time when the user 10 used the present service, contents of a dish made at that time, a recipe of the dish made at that time, and the like may be set.

The dish proposal unit 202 is configured to determine a recommended dish for each user 10 on the basis of the user information managed by user information management unit 201.

For example, the dish proposal unit 202 may be configured to determine a recommended dish for the user 10 on the basis of a family structure, allergy information, or the like of the user 10, a past use record of the user 10, a desired use form of the user 10, and the like.

Here, the dish proposal unit 202 may be configured to propose, to each user 10, a recommended dish for the user 10 for a predetermined period (for example, one month or one week).

In addition, the recommended dish is preferably a dish that can be made during a break time, such as an early morning or a lunch break, or during a spare time, such as after hours or lunch time. For example, the recommended dish is preferably a dish that can be made in a predetermined time (for example, 10 minutes to 20 minutes).

Furthermore, the dish proposal unit 202 may be configured to propose the same recommended dish for a group including a plurality of users 10 at the same date and time (time zone) in the same space. In such a case, the dish proposal unit 202 may be configured to determine the recommended dish on the basis of the number of users in the group.

Furthermore, the dish proposal unit 202 may be further configured to determine a recommended dish for each user 10 with reference to company information (described later) managed by the company information management unit 203.

For example, the dish proposal unit 202 may be further configured to determine a recommended dish for each user 10 with reference to constraint information of a space that can be designated by the company 200 in which the user 10 works.

Moreover, the dish proposal unit 202 may be configured to select a recommended dish for the user 10 by a predetermined method from among a plurality of recommended dishes stored by the management server 100.

For example, the dish proposal unit 202 may be configured to select a recommended dish for each user 10 by using a learning model obtained by machine learning of a correlation between the "profile information" of the user 10 and a recommended dish.

Note that the recipes of the plurality of recommended dishes stored by the management server 100 may be provided by a cook or the like having a cooperative relationship with the present service.

Here, the dish proposal unit 202 may be configured to select a plurality of recommended dishes as the recommended dishes for each user 10.

The company information management unit 203 is configured to manage company information that is information related to the company 200 that agrees to provide the present service.

For example, the company information management unit 203 is configured to manage at least "designated date and time information" and "designated space information" in association with each other as the company information for each company 200 as illustrated in FIG. 8.

Here, the "designated date and time information" is information indicating a designated date and time designated as a date and time providable by the company 200. Note that the "designated date and time information" may be set to include a time designated as a time that can be provided by the company 200 in addition to the information indicating the designated date and time (for example, 12:00 to 13:00 or the like).

Furthermore, the "designated space information" is information indicating a designated space (for example, a meeting room, a working room, a rental space, or the like) designated as a space providable by the company 200 at the designated date and time set in the "designated date and time information".

Note that, although not illustrated, the company information management unit 203 may be configured to further manage, as the company information, providing place information or the like that is information related to the designated space set in the "designated space information".

For example, in the providing place information, size information indicating the size of the designated space of the company 200, storage information, constraint information, and the like may be set.

Here, the storage information is information regarding ingredients, seasonings, and the like, cooking utensils, and the like stored for the designated space of the company 200.

Furthermore, the constraint information is constraint information regarding use of the designated space of the company 200, and includes constraint information regarding equipment in the designated space of the company 200, constraint information regarding environment maintenance of the designated space of the company 200, constraint information regarding the maintenance of cooking utensils for cooking in the designated space of the company 200, and the like.

For example, the constraint information regarding the equipment in the designated space of the company 200 includes limitations regarding the availability of each equipment for electricity, water, gas, ventilation, and the like and usage of each equipment, and the like in the designated space of the company 200.

Furthermore, for example, the constraint information regarding the environment maintenance of the designated space of the company 200 includes a limitation (for example, a limitation on the environment of the designated space in which it is not preferable that an aroma derived from an ingredient or a dish remains, and the like) regarding the environment maintenance of the designated space after cooking.

Furthermore, for example, the constraint information regarding the maintenance of the cooking utensils for cooking in the designated space of the company 200 includes a limitation regarding maintenance such as cleaning of the cooking utensils (for example, a limitation on ingredients and dishes that are difficult to wash, and the like).

The user interface 204 serves as an interface configured to communicate with the terminal 20 of the user 10.

Figure 9:
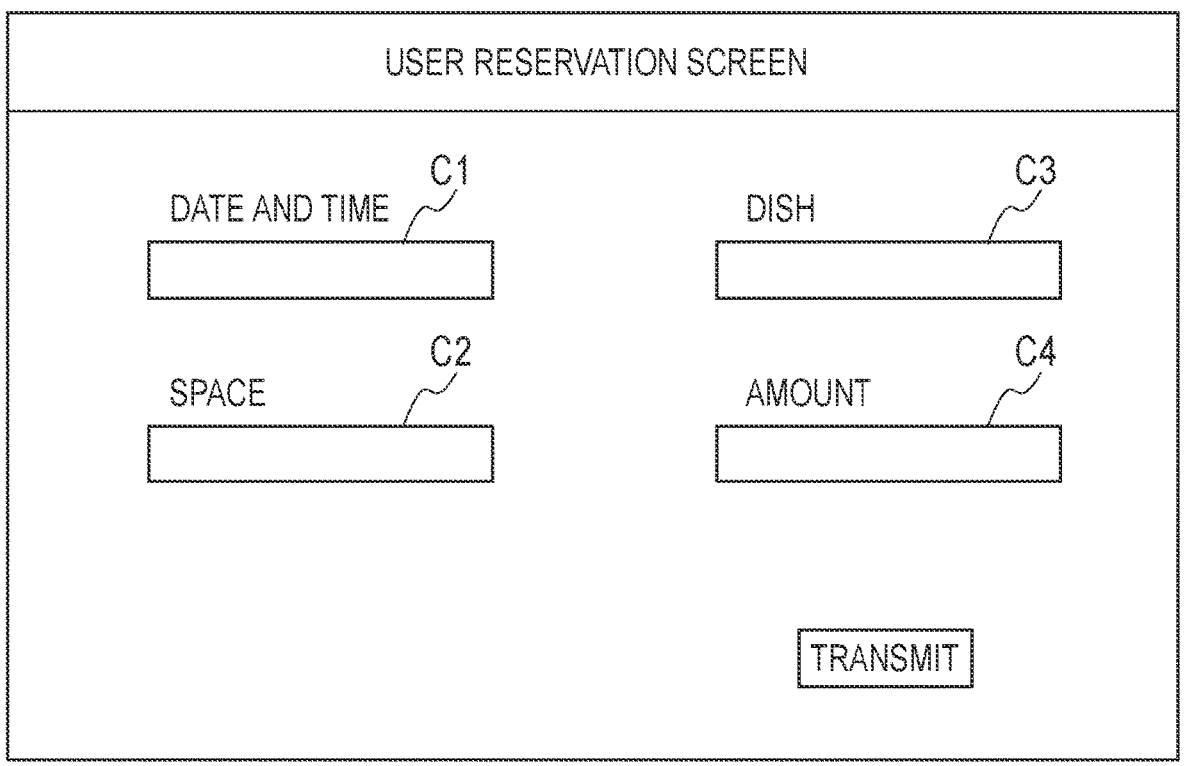
FIG. 9 illustrates an example of a user reservation screen provided by a user interface 204 of the management server 100 according to the second and third embodiments and displayed on a terminal 20 of a user 10.

For example, the user interface 204 may be configured to cause the terminal 20 of the user 10 to display a user reservation screen, as illustrated in FIG. 9 in response to a request from the terminal 20 of the user 10.

In a case where the user 10 desires to make a dish using the present service, the user can access the management server 100 using the terminal 20 and reserve the present service on the user reservation screen (see, for example, FIG. 9) provided by the management server 100.

For example, on the user reservation screen, the user 10 can reserve the present service by inputting a desired date and time in a field C1, inputting a desired space in a field C2, inputting a desired dish in a field C3, and inputting a desired amount of dish in a field C4.

Here, the user interface 204 may be configured to display a plurality of input candidates in the fields C1 to C4 on the user reservation screen, and the user 10 may select a desired input candidate from among the plurality of input candidates.

For example, the user interface 204 may be configured to display a combination of the "designated date and time information" and the "designated space information" managed by the company information management unit 203 in the fields C1 and C2.

In addition, the user interface 204 may be configured to display a plurality of recommended dishes determined by the dish proposal unit 202 in the field C3.

The reservation information management unit 205 is configured to manage reservation information that is information related to the reservation of the present service by the user 10 using the terminal 20.

Specifically, as illustrated in FIG. 10, the reservation information management unit 205 is configured to manage at least "selected date and time information", "selected space information", "selected dish information", "amount information", and "content information" in association with each other as the reservation information for each user 10.

Here, the "selected date and time information" is information indicating the selected date and time selected by the user 10 from among the designated date and time designated by the company 200 as the date and time (for example, available time zone or the like) at which the user 10 desires to use the present service.

The "selected space information" is information indicating a selected space selected by the user 10 from among the designated space designated by the company 200 as a space (for example, a meeting room, a working room, a rental space, or the like) of the company 200 in which the user 10 desires to use the present service.

The "selected dish information" is information indicating the dish (the selected dish selected by user 10 in the field C3 on the user reservation screen) that the user 10 desires to make in the selected space indicated by the "selected space information" at the selected date and time indicated by the "selected date and time information" described above.

The "amount information" is information indicating how many people the user 10 wants to make the dish indicated by "selected dish information".

The "content information" is content identification information for identifying the content corresponding to the recipe of the dish indicated by the "selected dish information."

The reservation information management unit 205 may be configured to further manage other information as the reservation information.

The order placement unit 206 is configured to order a first seasoning and a second seasoning together with the ingredients of the dish described above.

Here, the first seasoning is a seasoning managed in stock in the above-described designated space and shared by a plurality of users 10. Here, the first seasoning is a seasoning stored in a container such as a bottle or a glass bottle shared by the plurality of users 10. Examples of the first seasoning include salt, spices (for example, pepper and the like), oil, sugar, vinegar, soy sauce, mirin, miso, ketchup, and mayonnaise.

For example, the order placement unit 206 may be configured to order the first seasoning in consideration of the storage information, the constraint information, and the like of the designated space described above.

That is, the order placement unit 206 may be configured to order the first seasoning from the food manufacturer 400, not every day but at a predetermined timing before the stock becomes insufficient in the designated space described above.

Furthermore, the second seasoning is a seasoning that is not managed as stock in the above-described designated space and is used for cooking by each user 10. Here, the second seasoning is a seasoning individually weighed and packed for each user 10.

Specifically, the second seasoning may contain at least one liquid seasoning, a viscous seasoning, and a powdered seasoning used in the above-described dishes. Examples of the second seasoning include a sauce, a sauce, a dressing, a combined seasoning, and seasonings (sugar, vinegar, soy sauce, mirin, miso, ketchup, mayonnaise, and the like) weighed and packed, which are used in the above-described dishes.

Furthermore, the second seasoning is packed together with the ingredients and delivered to the selected space by the selected date and time. Here, the second seasoning is delivered in an amount corresponding to the order amount ordered by the order placement unit 206.

Specifically, the order placement unit 206 is configured to order at least one of the ingredients and the second seasoning necessary for making the dish corresponding to the recipe on the basis of the recipe of the dish proposed by the dish proposal unit 202 and selected by each user 10. Note that the order placement unit 206 may be configured to order a plurality of second seasonings.

Here, the order placement unit 206 is configured to determine the order amount of the second seasoning for each user 10 on the basis of the "taste preference information" included in the user information described above and the "selected dish information", the "amount information", and the like included in the reservation information described above, for each user 10.

For example, firstly, the order placement unit 206 is configured to specify a user 10 who has made a reservation for each designated space on a target date.

Here, the target date is a date before the designated date and time indicated by the "designated date and time information" by a predetermined period (for example, one week or the like).

That is, the target date is a date on which an order needs to be placed in order to deliver the ingredients and the second seasoning to the designated space indicated by the "designated space information" in time for the designated date and time.

Secondly, the order placement unit 206 is configured to determine, for each user 10, order amounts of ingredients for the user 10 on the basis of the "selected dish information", the "amount information", and the like included in the reservation information of the specified user 10.

Third, the order placement unit 206 is configured to determine, for each user 10, the order amount of the second seasoning of the user 10 on the basis of the "taste preference information" included in the user information of the specified user 10 and the "selected dish information" and the "amount information" included in the reservation information.

Here, for example, the order placement unit 206 may be configured to determine the reference amount of the order amount of the second seasoning of the user 10 on the basis of the "selected dish information" and the "amount information" included in the reservation information of the specified user 10.

Thereafter, in a case where "normal" is indicated by the "taste preference information" included in the user information of the user 10, the order placement unit 206 may be configured to set the reference amount as the order amount of the second seasoning of the user 10.

Furthermore, in a case where "light" is indicated by the "taste preference information" included in the user information of the user 10, the order placement unit 206 may be configured to set an amount obtained by reducing the reference amount by a first predetermined amount as the order amount of the second seasoning of the user 10.

Furthermore, in a case where "strong" is indicated by the "taste preference information" included in the user information of the user 10, the order placement unit 206 may be configured to set an amount obtained by adding a second predetermined amount to the reference amount as the order amount of the second seasoning of the user 10.

Note that the order placement unit 206 may be configured to change the type of the second seasoning to be ordered according to the "taste preference information" included in the user information of the user 10.

For example, the order placement unit 206 may be configured to order a miso-based sauce (a kind of sauce) as the second seasoning in a case where "normal" or "light" is indicated by the "taste preference information" included in the user information of the user 10, and order doubanjiang in addition to the miso-based sauce as the second seasoning in a case where "strong" is indicated by the "taste preference information".

The above-described order may be placed by e-mail or FAX via a network, may be placed in the form of input to a prescribed format in a server or the like managed by the distributor 300 or the food manufacturer 400, or may be placed by voice call.

The content distribution unit 207 is configured to refer to the user information managed by the user information management unit 201 and the reservation information managed by the reservation information management unit 205, and distribute the content identified by the "content information" associated with the "selected date and time information" to a mail address or the like indicated in the "address information" associated with the "user ID" of each user 10 before the selected date and time set in the "selected date and time information".

Here, the content may be a moving image or audio indicating how to make a dish corresponding to each recipe or may include a text, a photograph, an image (still image), a picture, or the like describing how to make such a dish.

Note that the content delivery unit 207 may be configured to deliver content acquired from the outside or may be configured to deliver content input by the administrator of the management server 100.

The delivery arrangement unit 208 is configured to arrange for the delivery company 500 delivery of the dish made by the user 10 on the basis of a delivery request from the user 10.

The such delivery arrangement may be made by electronic mail or FAX via a network, may be made in the form of input to a prescribed format in a server or the like managed by the delivery company 500, or may be made by voice call.

An example of the operation of the management server 100 according to the present embodiment will be described below with reference to FIG. 11.

As illustrated in FIG. 11, when each user 10 makes a reservation of the present service on the user reservation screen as illustrated in FIG. 9 in step S101, the reservation information management unit 205 of the management server 100 generates reservation information for each user 10 on the basis of the reservation.

In step S102, the order placement unit 206 of the management server 100 specifies a user 10 who has made a reservation for each designated space on the target date.

In step S103, the order placement unit 206 extracts the user information and reservation information of the user 10 specified in step S102.

In step S104, the order placement unit 206 determines the order amount of the second seasoning for each user 10 on the basis of "taste preference information" included in the user information extracted in step S103 and "selected dish information" and "amount information" included in the reservation information.

In step S105, the order placement unit 206 orders the second seasoning based on the order amount determined in step S104.

According to the service providing system 1 according to the present embodiment, by renting a space of the company 200, it is possible to make a dish in a spare time during a moving time or a working time of the user 10, and moreover, a troublesome recipe is devised by the management server 100 as a substitute. Therefore, in a busy dual-income household (in particular, a double-income parenting household), it is possible to increase a time for communication (in particular, communication with children) between family members, and it is also possible to secure own time.

In addition, according to the service providing system 1 according to the present embodiment, since the user 10 himself/herself can cook in the spare time during the moving time or working time of the user 10, it is possible to eliminate the guilt of not cooking by himself/herself while reducing the cost as compared with the case of using home-meal replacement or a home-delivered meal.

Furthermore, according to the service providing system 1 according to the present embodiment, the user 10 can cook without being conscious of the purchase of ingredients, seasonings, and the like, maintenance of cooking utensils, and tidying and cleaning of a kitchen after cooking at home.

Furthermore, according to the service providing system 1 according to the present embodiment, the order amount of the second seasoning (alternatively, the type of the second seasoning) can be changed according to the "taste preference information" of each user 10, so that each user 10 can easily make a dish matching his/her taste preferences.

Furthermore, according to the service providing system 1 according to the present embodiment, it is possible to adopt an optimal ordering method in accordance with the characteristics of each of the first seasonings shared among the plurality of users 10 and the second seasoning individually used for each user.

Furthermore, according to the service providing system 1 according to the present embodiment, it is possible to reduce the delivery cost by weighing the second seasoning together with the ingredients and then packing and delivering the second seasoning.

Third Embodiment

A third embodiment of the present invention will be described below focusing on differences from the above-described first and second embodiments with reference to FIGS. 1, 6 to 10, 12, and 13.

As illustrated in FIG. 1, a service providing system 1 according to the present embodiment includes a terminal 20, a management server 100, a company 200, a distributor 300, a food manufacturer 400, and a delivery company 500.

As illustrated in FIG. 6, the management server 100 includes a user information management unit 201, a dish proposal unit 202, a company information management unit 203, a user interface (IF) 204, a reservation information management unit 205, an order placement unit 206, a content distribution unit 207, and a delivery arrangement unit 208. Here, the management server 100 may not include the delivery arrangement unit 208.

The user information management unit 201 is configured to manage user information which is information related to the user 10 registered as a member of the present service. Here, the user information management unit 201 is configured to generate user information of each user 10 on the basis of information input by the terminal 20 of the user 10.

For example, as illustrated in FIG. 7, the user information management unit 201 is configured to manage, for each user 10, at least a "user ID", "address information", and "taste preference information" in association with each other as the user information.

Here, the "user ID" is information for identifying the user 10.

The "address information" is the address information of a transmission destination of content designated by the user 10. For example, as illustrated in FIG. 7, a mail address or the like of the terminal 20 of the user 10 may be set in the "address information".

The "taste preference information" is information indicating the taste preferences of the user 10. For example, as illustrated in FIG. 7, "strong" indicates that strong seasoning is preferred, "light" indicates that light seasoning is preferred, "normal" indicates that normal seasoning is preferred, and "spicy" indicates that spicy seasoning is preferred, and the like may be set in the "taste preference information".

Note that, although not illustrated, the user information management unit 201 may be further configured to manage, as the user information, profile information that is information related to the profile of the user 10, a use history that is information related to a use history of the present service by the user 10, and the like.

For example, the date of birth, gender, family structure, food preferences, allergy information, and presence or absence of a medical history of the user 10, a company in which the user 10 works, a desired use form and the like of the user 10 may be set in the profile information.

Note that the above-described "taste preference information" may be included in the profile information.

Here, the desired use form and the like are information related to the use form that the user 10 desires to use. As the desired use form, information for designating a budget, selection of a scene of eating a dish (in the case of eating the dish in the office, in the case of taking the dish home and eating it, or in both cases), a menu intention, or the like may be set.

Note that the menu intention is information indicating a plan prepared for each purpose of the user 10. For example, in the menu intention, a meal prep plan assuming freezing or the like, a plan for children (for example, for a person who wants to cook baby food, infant food, or the like), a standard dish plan (for those who emphasize the balance of the entire menu, and the like), a health plan (for those who intend to diet, and the like), and the like may be set.

For example, in the "use history", information such as the date and time when the user 10 used the present service, contents of a dish made at that time, a recipe of the dish made at that time, and the like may be set.

The dish proposal unit 202 is configured to determine a recommended dish for each user 10 on the basis of the user information managed by user information management unit 201.

For example, the dish proposal unit 202 may be configured to determine a recommended dish for the user 10 on the basis of a family structure, allergy information, or the like of the user 10, a past use record of the user 10, a desired use form of the user 10, and the like.

Here, the dish proposal unit 202 may be configured to propose, to each user 10, a recommended dish for the user 10 for a predetermined period (for example, one month or one week).

In addition, the recommended dish is preferably a dish that can be made during a break time, such as an early morning or a lunch break, or during a spare time such as after hours or lunch time. For example, the recommended dish is preferably a dish that can be made in a predetermined time (for example, 10 minutes to 20 minutes).

Furthermore, the dish proposal unit 202 may be configured to propose the same recommended dish for a group including a plurality of users 10 at the same date and time (time zone) in the same space. In such a case, the dish proposal unit 202 may be configured to determine the recommended dish on the basis of the number of users in the group.

Furthermore, the dish proposal unit 202 may be further configured to determine a recommended dish for each user 10 with reference to company information (described later) managed by the company information management unit 203.

For example, the dish proposal unit 202 may be further configured to determine a recommended dish for each user 10 with reference to constraint information of a space that can be designated by the company 200 in which the user 10 works.

Moreover, the dish proposal unit 202 may be configured to select a recommended dish for the user 10 by a predetermined method from among a plurality of recommended dishes stored by the management server 100.

For example, the dish proposal unit 202 may be configured to select a recommended dish for each user 10 by using a learning model obtained by machine learning of a correlation between the "profile information" of the user 10 and a recommended dish.

Note that the recipes of the plurality of recommended dishes stored by the management server 100 may be provided by a cook or the like having a cooperative relationship with the present service.

Here, the dish proposal unit 202 may be configured to select a plurality of recommended dishes as the recommended dishes for each user 10.

The company information management unit 203 is configured to manage company information that is information related to the company 200 that agrees to provide the present service.

For example, the company information management unit 203 is configured to manage at least "designated date and time information" and "designated space information" in association with each other as the company information for each company 200 as illustrated in FIG. 8.

Here, the "designated date and time information" is information indicating a designated date and time designated as a date and time providable by the company 200. Note that the "designated date and time information" may be set to include a time designated as a time that can be provided by the company 200 in addition to the information indicating the designated date and time (for example, 12:00 to 13:00 or the like).

Furthermore, the "designated space information" is information indicating a designated space (for example, a meeting room, a working room, a rental space, or the like) designated as a space providable by the company 200 at the designated date and time set in the "designated date and time information".

Note that, although not illustrated, the company information management unit 203 may be configured to further manage, as the company information, providing place information or the like that is information related to the designated space set in the "designated space information".

For example, in the providing place information, size information indicating the size of the designated space of the company 200, storage information, constraint information, and the like may be set.

Here, the storage information is information regarding ingredients, seasonings, and the like, cooking utensils, and the like stored for the designated space of the company 200.

Furthermore, the constraint information is constraint information regarding the use of the designated space of the company 200, and includes constraint information regarding equipment in the designated space of the company 200, constraint information regarding environment maintenance of the designated space of the company 200, constraint information regarding maintenance of cooking utensils for cooking in the designated space of the company 200, and the like.

For example, the constraint information regarding the equipment in the designated space of the company 200 includes limitations regarding the availability of each equipment for electricity, water, gas, ventilation, and the like and usage of each equipment, and the like in the designated space of the company 200.

Furthermore, for example, the constraint information regarding the environment maintenance of the designated space of the company 200 includes a limitation (for example, a limitation on the environment of the designated space in which it is not preferable that an aroma derived from an ingredient or a dish remains, and the like) regarding the environment maintenance of the designated space after cooking.

Furthermore, for example, the constraint information regarding the maintenance of the cooking utensils for cooking in the designated space of the company 200 includes a limitation regarding maintenance such as cleaning of the cooking utensils (for example, a limitation on ingredients and dishes that are difficult to wash, and the like).

The user interface 204 serves as an interface configured to communicate with the terminal 20 of the user 10.

For example, the user interface 204 may be configured to cause the terminal 20 of the user 10 to display a user reservation screen as illustrated in FIG. 9 in response to a request from the terminal 20 of the user 10.

In a case where the user 10 desires to make a dish using the present service, the user can access the management server 100 using the terminal 20 and reserve the present service on the user reservation screen (see, for example, FIG. 9) provided by the management server 100.

For example, on the user reservation screen, the user 10 can reserve the present service by inputting a desired date and time in a field C1, inputting a desired space in a field C2, inputting a desired dish in a field C3, and inputting a desired amount of dish in a field C4.

Here, the user interface 204 may be configured to display a plurality of input candidates in the fields C1 to C4 on the user reservation screen, and the user 10 may select a desired input candidate from among the plurality of input candidates.

For example, the user interface 204 may be configured to display a combination of the "designated date and time information" and the "designated space information" managed by the company information management unit 203 in the fields C1 and C2.

In addition, the user interface 204 may be configured to display a plurality of recommended dishes determined by the dish proposal unit 202 in the field C3.

The reservation information management unit 205 is configured to manage reservation information that is information related to the reservation of the present service by the user 10 using the terminal 20.

Specifically, as illustrated in FIG. 10, the reservation information management unit 205 is configured to manage at least "selected date and time information", "selected space information", "selected dish information", "amount information", and "content information" in association with each other as the reservation information for each user 10.

Here, the "selected date and time information" is information indicating the selected date and time selected by the user 10 from among the designated date and time designated by the company 200 as the date and time (for example, available time zone or the like) at which the user 10 desires to use the present service.

The "selected space information" is information indicating a selected space selected by the user 10 from among the designated space designated by the company 200 as a space (for example, a meeting room, a working room, a rental space, or the like) of the company 200 in which the user 10 desires to use the present service.

The "selected dish information" is information indicating the dish (the selected dish selected by user 10 in the field C3 on the user reservation screen) that the user 10 desires to make in the selected space indicated by the "selected space information" at the selected date and time indicated by the "selected date and time information" described above.

The "amount information" is information indicating how many people the user 10 wants to make the dish indicated by "selected dish information".

The "content information" is content identification information for identifying the content corresponding to the recipe of the dish indicated by the "selected dish information."

The reservation information management unit 205 may be configured to further manage other information as the reservation information.

The order placement unit 206 is configured to order seasoning together with the ingredients of the above-described dish.

For example, the order placement unit 206 may be configured to order the seasoning in consideration of the storage information, the constraint information, and the like of the designated space described above.

That is, the order placement unit 206 may be configured to order the seasoning from the food manufacturer 400 not every day but at a predetermined timing before the stock becomes insufficient in the designated space described above.

Specifically, the order placement unit 206 is configured to order at least one of the ingredients and the seasoning necessary for making the dish corresponding to the recipe on the basis of the recipe of the dish proposed by the dish proposal unit 202 and selected by each user 10.

Note that the order placement unit 206 may be configured to order ingredients for the user 10 scheduled to cook at the selected date and time a predetermined period before the selected date and time.

The above-described order may be placed by e-mail or FAX via a network, may be placed in the form of input to a prescribed format in a server or the like managed by the distributor 300 or the food manufacturer 400, or may be placed by voice call.

The content distribution unit 207 is configured to refer to the user information managed by the user information management unit 201 and the reservation information managed by the reservation information management unit 205, and distribute the content identified by the "content information" associated with the "selected date and time information" to a mail address or the like indicated in the "address information" associated with the "user ID" of each user 10 before the selected date and time set in the "selected date and time information".

For example, the content distribution unit 207 is configured to generate and distribute a "cooking recipe" as illustrated in FIG. 12 as the content.

Here, the "cooking recipe" illustrated in FIG. 12 includes a "base recipe" and "seasoning options".

For example, as illustrated in FIG. 12, the "base recipe" includes a "name", "ingredients", and "how to make" and is a recipe to be a base of the "cooking recipe".

Furthermore, the "seasoning options" are recipes that are individually recommended (recommended) on the basis of the taste preferences of the user 10.

Specifically, on the basis of the "taste preference information" managed by the user information management unit 201 and the "content information" and the "amount information" managed by the reservation information management unit 205, the content distribution unit 207 is configured to generate and distribute, for each user 10, content in which the description of the amount of at least one of the ingredients or the seasoning in the recipe of the dish set in the "selected dish information" is changed.

Here, as illustrated in FIG. 12, the content distribution unit 207 may be configured to change the description of the amounts of the "ingredients" in the content ("cooking recipe") identified by the content identification information set in the "content information" on the basis of the "amount information" for each user 10.

For example, as illustrated in FIG. 12, the content distribution unit 207 may be configured to change, for each user 10, the description regarding amounts (200 g, 220 g, and the like) of ingredients (for example, thinly sliced pork loins and cut vegetables) and the description regarding amounts (1 tablespoon, 1 teaspoon, and the like) of seasoning (for example, a miso-based sauce (common seasoning)) on the basis of the above-described "amount information".

Furthermore, the content distribution unit 207 may be configured to change the description of the amounts in the "seasoning options" in the content ("cooking recipe") identified by the content identification information set in the "content information" on the basis of the above-described "taste preference information" for each user 10.

For example, as illustrated in FIG. 12, the content distribution unit 207 may be configured to change, for each user 10, the description of the amounts for the seasonings in the "first in the recommended order" to the "third in the recommended order" in the "seasoning options" on the basis of the "taste preference information" described above.

For example, the content distribution unit 207 may be configured to change, for each user 10, the contents of the "first in the recommended order" to the "third in the recommended order" in the "seasoning options" on the basis of the "taste preference information" described above.

For example, in a case where a user 100 desires to adopt the "first in the recommended order (light taste)" in the "seasoning options" to make the dish (stir-fried pork and cabbage with miso) illustrated in FIG. 12, a step of "adding the remaining ½ of the miso-based sauce and mixing the whole well" in the fourth step of "how to make" of "base recipe" is changed to a step of "adding the remaining ¼ of the miso-based sauce and mixing the whole well".

Similarly, in a case where the user 100 desires to adopt the "second in the recommended order (strong taste)" in the "seasoning options" to make the dish (stir-fried pork and cabbage with miso) illustrated in FIG. 12, the user 100 changes the step to a step of "adding a miso-based sauce delivered as an optional seasoning" in addition to the fourth step of "adding the remaining ½ of the miso-based sauce and mixing the whole well" in "how to make" of "base recipe".

Furthermore, in a case where the user 100 desires to adopt the "third in the recommended order (spicy taste)" in the "seasoning options" to make the dish (stir-fried pork and cabbage with miso) illustrated in FIG. 12, the user 100 changes the step to a step of "adding doubanjiang delivered as an optional seasoning" in addition to the fourth step of "adding the remaining ½ of the miso-based sauce and mixing the whole well" in "how to make" of "base recipe".

Note that the content distribution unit 207 may be configured to extract content including the contents of the recipe of the base dish as the content identified by the content identification information set in the "content information" described above, and generate content including the recipe of the dish to be distributed to each user 10 by changing the contents of the recipe of the base dish as described above.

Here, the contents of the recipe of the basic dish may be generated assuming, for example, a case where the amount is for one person and the seasoning is "normal".

Furthermore, the content may be constituted by one or a plurality of still images including the contents and the like in the recipe of each dish.

In the above-described embodiment, a case where the content is configured by a still image has been described as an example, but the present invention is not limited to such a case, and is also applicable to a case where the content is configured by a moving image, audio, a photograph, a text, or the like.

Note that the content delivery unit 207 may be configured to deliver content acquired from the outside or may be configured to deliver content input by the administrator of the management server 100.

The delivery arrangement unit 208 is configured to arrange for the delivery company 500 delivery of the dish made by the user 10 on the basis of a delivery request from the user 10.

The such delivery arrangement may be made by electronic mail or FAX via a network, may be made in the form of input to a prescribed format in a server or the like managed by the delivery company 500, or may be made by voice call.

An example of the operation of the management server 100 according to the present embodiment will be described below with reference to FIG. 13.

Figure 13:
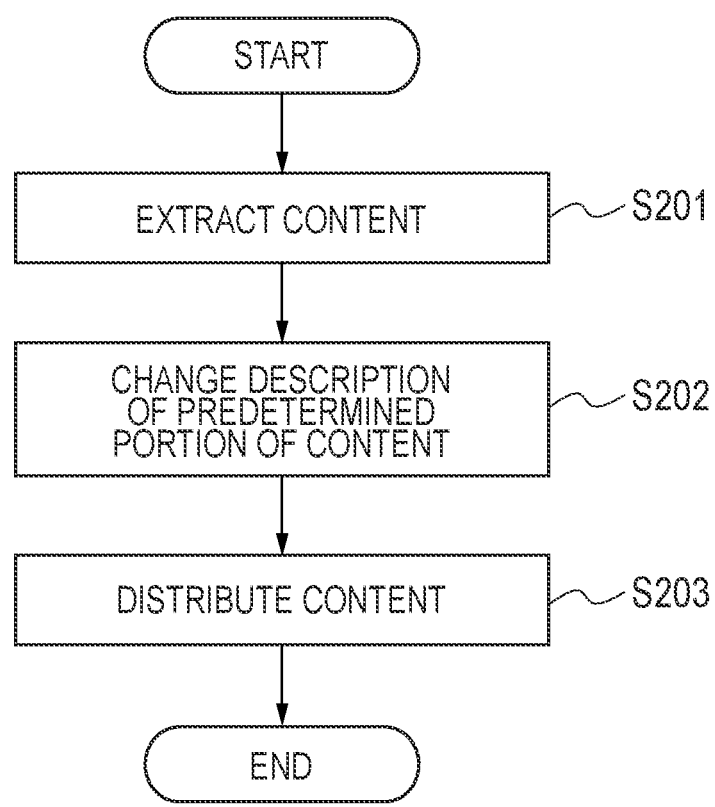
FIG. 13 is a flowchart illustrating an example of an operation of the management server 100 according to the third embodiment.

As illustrated in FIG. 13, in step S201, the content distribution unit 207 of the management server 100 according to the present embodiment refers to the reservation information managed by the reservation information management unit 205 at a predetermined timing and extracts the content identified by the content identification information set in the "content information" associated with the "selected date and time information" that satisfies a predetermined condition.

Here, the predetermined timing may be, for example, a daily specific time (for example, 9:00 AM or the like) or a specific time of a specific day (for example, every Sunday or the like).

The "selected date and time information" satisfying the predetermined condition may be "selected date and time information", in which the set selected date and time is a date a predetermined period before the predetermined timing.

In step S202, on the basis of the "taste preference information" managed by user information management unit 201 and the "amount information" managed by the reservation information management unit 205, the content distribution unit 207 changes the description (that is, description of the amount of at least one of an ingredient and seasoning in the recipe of the dish included in the content) of a predetermined portion of the extracted content for each user 10.

The predetermined portion is, for example, a portion of the "ingredients" in the "base recipe" illustrated in FIG. 12 and portions of the "first in the recommended order" to the "third in the recommended order" in the "seasoning options".

In step S203, the content distribution unit 207 distributes the changed content to a mail address set in the "address information" managed by the user information management unit 201 for each user 10.

According to the service providing system 1 according to the present embodiment, by renting a space of the company 200, it is possible to make a dish in a spare time during a moving time or a working time of the user 10, and moreover, a troublesome recipe is devised by the management server 100 as a substitute. Therefore, in a busy dual-income household (in particular, a double-income parenting household), it is possible to increase the time for communication (in particular, communication with children) between family members, and it is also possible to secure own time.

In addition, according to the service providing system 1 according to the present embodiment, since the user 10 himself/herself can cook in the spare time during the moving time or working time of the user 10, it is possible to eliminate the guilt of not cooking by himself/herself while reducing the cost as compared with the case of using home-meal replacement or a home-delivered meal.

Furthermore, according to the service providing system 1 according to the present embodiment, the user 10 can cook without being conscious of the purchase of ingredients, seasonings, and the like, maintenance of cooking utensils, and tidying and cleaning of a kitchen after cooking at home.

Furthermore, according to the service providing system 1 according to the present embodiment, it is possible to distribute content including a recipe of an individual dish reflecting taste preferences and a necessary amount for each user 10.

Furthermore, according to the service providing system 1 according to the present embodiment, by changing only necessary portions from the basic content, it is possible to easily generate a recipe for an individual dish according to taste preferences and a necessary amount for each user 10.

Furthermore, according to the service providing system 1 according to the present embodiment, it is not necessary to individually prepare a plurality of pieces of content including recipes of a plurality of dishes for taste preferences and a necessary amount for each user 10.

Fourth Embodiment

A fourth embodiment of the present invention will be described below focusing on differences from the above-described first to third embodiments with reference to FIGS. 1, 8, and 14 to 19.

As illustrated in FIG. 1, the service providing system 1 according to the present embodiment includes a terminal 20, a management server 100, a company 200, a distributor 300, a food manufacturer 400, and a delivery company 500.

In the present embodiment, a case where a dish includes a main dish and a side dish will be described, but the present invention is not limited to such a case. For example, the present invention is also applicable to a case where the dish includes a soup in addition to the main dish and the side dish. Hereinafter, in the present embodiment, the main dish is referred to as a first dish, and the side dish and the soup are referred to as a second dish. Note that the present embodiment is also applicable to a case where a plurality of second dishes is made.

As illustrated in FIG. 1, the service providing system 1 according to the present embodiment includes a terminal 20, a management server 100, a company 200, a distributor 300, a food manufacturer 400, and a delivery company 500.

Figure 14:
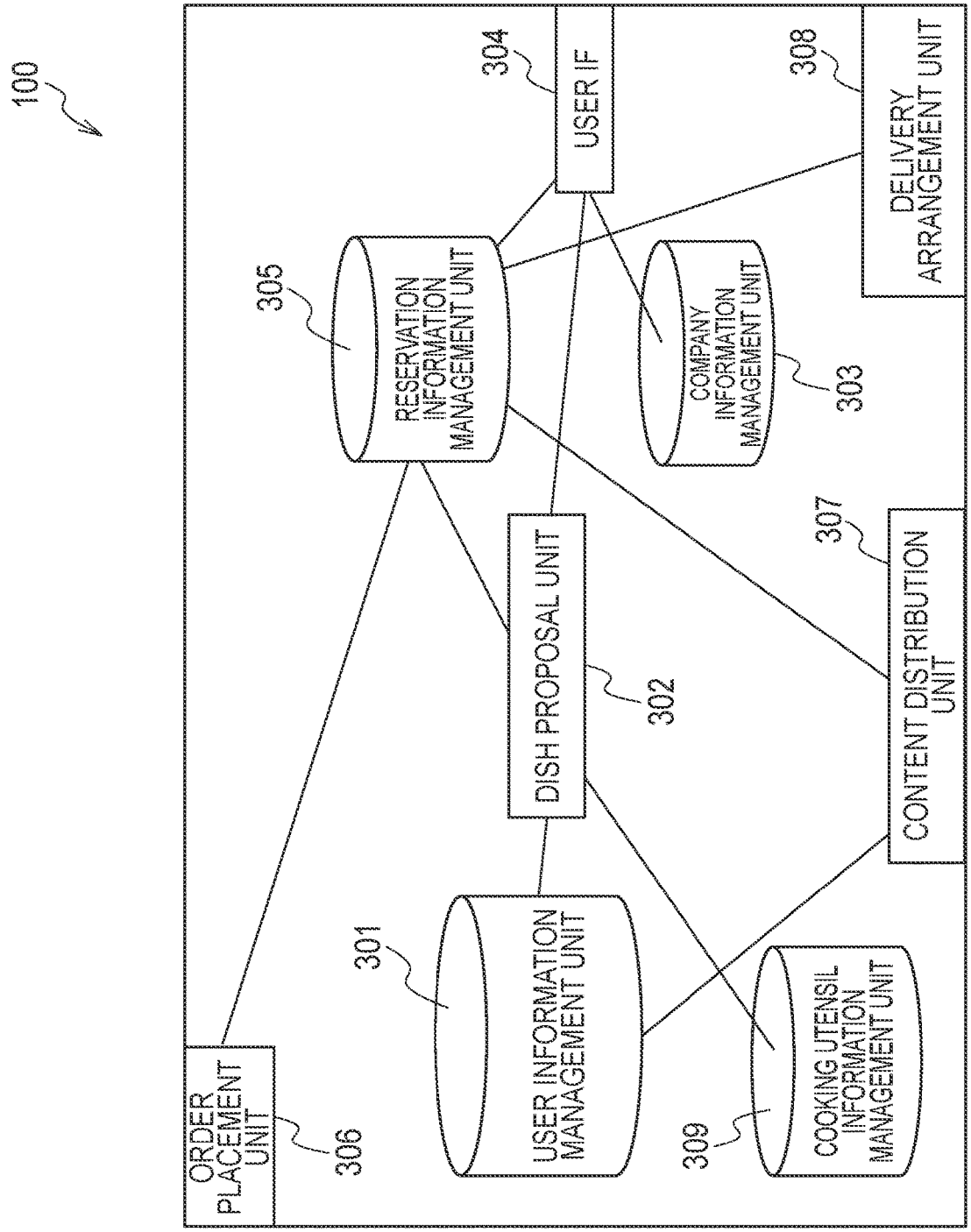
FIG. 14 illustrates an example of functional blocks of the management server 100 according to the fourth embodiment.

As illustrated in FIG. 14, the management server 100 includes a user information management unit 301, a dish proposal unit 302, a company information management unit 303, a user interface (IF) 304, a reservation information management unit 305, an order placement unit 306, a content distribution unit 307, a delivery arrangement unit 308, and a cooking utensil information management unit 309. Here, the management server 100 may not include the delivery arrangement unit 308.

The user information management unit 301 is configured to manage user information which is information related to each user 10 registered as a member of the present service. Here, the user information management unit 301 is configured to generate user information of each user 10 on the basis of information input by the terminal 20 of the user 10.

For example, as illustrated in FIG. 15, the user information management unit 301 is configured to manage at least a "user ID", "address information", and "profile information" in association with each other as the user information for each user 10.

Here, the "user ID" is information for identifying the user 10.

The "address information" is address information of a transmission destination of content designated by the user 10. For example, as illustrated in FIG. 15, a mail address or the like of the terminal 20 of the user 10 may be set in the "address information".

The "profile information" is information related to the profile of the user 10. For example, the date of birth, gender, family structure, food preferences, allergy information, and presence or absence of a medical history of the user 10, a company in which the user 10 works, a desired use form and the like of the user 10 may be set in the "profile information".

Here, the desired use form and the like are information related to the use form that the user 10 desires to use. As the desired use form, information for designating a budget, selection of a scene of eating a dish (in the case of eating the dish in the office, in the case of taking the dish home and eating it, or in both cases), a menu intention, or the like may be set.

Note that the menu intention is information indicating a plan prepared for each purpose of the user 10. For example, in the menu intention, a meal prep plan assuming freezing or the like, a plan for children (for example, for a person who wants to cook baby food, infant food, or the like), a standard dish plan (for those who emphasize the balance of the entire menu, and the like), a health plan (for those who intend to diet, and the like), and the like may be set.

Furthermore, taste preference information that is information indicating the taste preferences of the user 10 may be set in the "profile information".

Note that, although not illustrated, the user information management unit 301 may be further configured to manage, as the user information, a use history or the like, which is information related to a use history of the present service by the user 10. For example, in the use history, information such as a date and time when the user 10 has used the present service, the type of a dish made at that time, a recipe of the dish made at that time, and the like may be set.

The cooking utensil information management unit 309 is configured to manage cooking utensil information associating cooking utensils used to make the above-described dish with a cooking time for using the cooking utensils.

Here, the cooking utensil information management unit 309 may be configured to manage as the cooking utensils used for making the dish, a first cooking utensil used for making the main dish (first dish) and a second cooking utensil used for making the side dish (second dish).

Similarly, the cooking utensil information management unit 309 may be configured to manage a first cooking time for using the first cooking utensil and a second cooking time for using the second cooking utensil as the cooking time for using the cooking utensils.

For example, as illustrated in FIG. 16A, the cooking utensil information management unit 309 may be configured to manage a "main dish", a "cooking utensil (first cooking utensil)", and a "cooking time (first cooking time)" in association with each other as the cooking utensil information.

Here, the "main dish" is information indicating the type of the main dish, and the "cooking utensil (first cooking utensil)" is information indicating the type of cooking utensil (first cooking utensil) to be used to make the main dish set in the "main dish", and the "cooking time (first cooking time)" is information indicating the cooking time (first cooking time) for using the first cooking utensil.

Similarly, for example, as illustrated in FIG. 16B, the cooking utensil information management unit 309 may be configured to manage a "side dish", a "cooking utensil (second cooking utensil)", and a "cooking time (second cooking time)" in association with each other as the cooking utensil information.

Here, the "side dish" is information indicating the type of side dish, and the "cooking utensil (second cooking utensil)" is information indicating the type of cooking utensil (second cooking utensil) to be used to make the side dish set in the "side dish", and the "cooking time (second cooking time)" is information indicating the cooking time (second cooking time) for using the second cooking utensil.

In the present embodiment, a case where the cooking utensils (the first cooking utensil and the second cooking utensil) include at least one electromagnetic cooking device (IH), and a microwave oven will be described, but the present invention is not limited to such a case.

The dish proposal unit 302 is configured to determine a recommended dish for each user 10 on the basis of at least one of the user information managed by the user information management unit 301 and the cooking utensil information managed by the cooking utensil information management unit 309.

In the present embodiment, a case where a combination of the main dish and the side dish is used as the recommended dish will be described, but the present invention is not limited to such a case. For example, the present invention is also applicable to a case where a combination of the main dish, the side dish, and the soup is used as the recommended dish, a case where a combination of the main dish and the soup is used as the recommended dish and a case where a combination of the main dish and a plurality of side dishes (alternatively, a plurality of soups) is used as the recommended dish.

For example, the dish proposal unit 302 may be configured to determine a recommended dish for the user 10 on the basis of a family structure, allergy information, or the like of the user 10, a past use record of the user 10, a desired use form of the user 10, and the like.

Here, the dish proposal unit 302 may be configured to propose, to each user 10, a recommended dish for the user 10 for a predetermined period (for example, one month or one week).

In addition, the recommended dish is preferably a dish that can be made during a break time such as an early morning or a lunch break, or during a spare time such as after hours or lunchtime. For example, the recommended dish is preferably a dish that can be made in a predetermined time (for example, 10 minutes to 20 minutes).

Furthermore, the dish proposal unit 302 may be configured to propose the same recommended dish for a group including a plurality of users 10 at the same date and time (time zone) in the same space. In such a case, the dish proposal unit 302 may be configured to determine the recommended dish on the basis of the number of users in the group.

Furthermore, the dish proposal unit 302 may be further configured to determine a recommended dish for each user 10 with reference to company information (described later) managed by the company information management unit 303.

For example, the dish proposal unit 302 may be further configured to determine a recommended dish for each user 10 with reference to constraint information of a space that can be designated by the company 200 in which the user 10 works.

Moreover, the dish proposal unit 302 may be configured to select a recommended dish for the user 10 by a predetermined method from among a plurality of recommended dishes stored by the management server 100.

For example, the dish proposal unit 302 may be configured to select a recommended dish for each user 10 by using a learning model obtained by machine learning of a correlation between the "profile information" of the user 10 and a recommended dish.

Note that the recipes of the plurality of recommended dishes stored by the management server 100 may be provided by a cook or the like having a cooperative relationship with the present service.

Here, the dish proposal unit 302 may be configured to select a plurality of recommended dishes as the recommended dishes for each user 10.

The dish proposal unit 302 may be configured to refer to the cooking utensil information management unit 309 and determine, as the above-described recommended dish, a combination of the main dish and a side dish in which a total time of a first cooking time for using a first cooking utensil to make the main dish and a second cooking time for using a second cooking utensil of the same type as the first cooking utensil to make the side dish does not exceed a predetermined time.

Note that the dish proposal unit 302 may be configured to select, as a recommended dish for each user 10, a plurality of main dishes and a plurality of side dishes that match each of the plurality of main dishes.

The company information management unit 303 is configured to manage company information that is information related to the company 200 that agrees to provide the present service.

For example, the company information management unit 303 is configured to manage at least "designated date and time information" and "designated space information" in association with each other as the company information for each company 200 as illustrated in FIG. 8.

Here, the "designated date and time information" is information indicating a designated date and time designated as a date and time providable by the company 200. Note that the "designated date and time information" may be set to include a time designated as a time that can be provided by the company 200 in addition to the information indicating the designated date and time (for example, 12:00 to 13:00 or the like).

Furthermore, the "designated space information" is information indicating a designated space (for example, a meeting room, a working room, a rental space, or the like) designated as a space providable by the company 200 at the designated date and time set in the "designated date and time information".

Note that, although not illustrated, the company information management unit 303 may be configured to further manage, as the company information, providing place information or the like that is information related to the designated space set in the "designated space information".

For example, in the providing place information, size information indicating the size of the designated space of the company 200, storage information, constraint information, and the like may be set.

Here, the storage information is information regarding ingredients, seasonings, and the like, cooking utensils, and the like stored for the designated space of the company 200.

Furthermore, the constraint information is constraint information regarding the use of the designated space of the company 200, and includes constraint information regarding equipment in the designated space of the company 200, constraint information regarding environment maintenance of the designated space of the company 200, constraint information regarding the maintenance of cooking utensils for cooking in the designated space of the company 200, constraint information regarding the number of available cooking utensils arranged in the designated space of the company 200, and the like.

For example, the constraint information regarding the equipment in the designated space of the company 200 includes limitations regarding the availability of each equipment for electricity, water, gas, ventilation, and the like and usage of each equipment, and the like in the designated space of the company 200.

Furthermore, for example, the constraint information regarding the environment maintenance of the designated space of the company 200 includes a limitation (for example, a limitation on the environment of the designated space in which it is not preferable that an aroma derived from an ingredient or a dish remains, and the like) regarding the environment maintenance of the designated space after cooking.

Furthermore, for example, the constraint information regarding the maintenance of the cooking utensils for cooking in the designated space of the company 200 includes a limitation regarding maintenance such as cleaning of the cooking utensils (for example, a limitation on ingredients and dishes that are difficult to wash, and the like).

Note that, in the present service, in a case where a plurality of users makes a dish in a selected space at a specific selected date and time, it is assumed that the number of available cooking utensils arranged in each selected space is smaller than the number of such users. For example, the number of cooking utensils arranged and available in each selected space may be four electromagnetic cooking devices and two microwave ovens on the assumption that four users simultaneously cook in the selected space.

The user interface 304 serves as an interface configured to communicate with the terminal 20 of the user 10.

Figure 17:
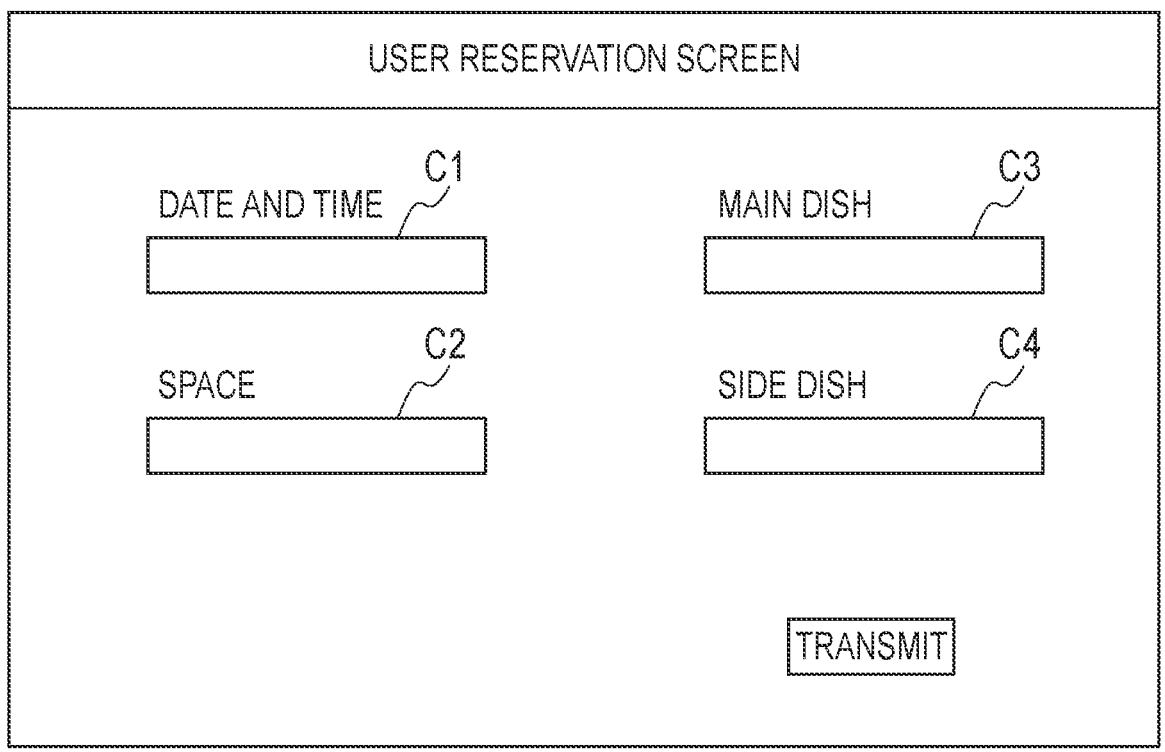
FIG. 17 illustrates an example of a user reservation screen provided by a user interface 304 of the management server 100 according to the fourth embodiment and displayed on the terminal 20 of the user 10.

For example, the user interface 304 may be configured to cause the terminal 20 of the user 10 to display a user reservation screen as illustrated in FIG. 17 in response to a request from the terminal 20 of the user 10.

In a case where the user 10 desires to make a dish using the present service, the user can access the management server 100 using the terminal 20 and reserve the present service on the user reservation screen (see, for example, FIG. 17) provided by the management server 100.

For example, on the user reservation screen, the user 10 can reserve the present service by inputting a desired date and time in a field C1, inputting the desired space in a field C2, inputting a type of desired main dish in a field C3, and inputting a type of desired side dish in a field C4.

Here, the user interface 304 may be configured to display a plurality of input candidates in the fields C1 to C4 on the user reservation screen, and the user 10 may select the desired input candidate from among the plurality of input candidates.

For example, the user interface 304 may be configured to display a combination of the "designated date and time information" and the "designated space information" managed by the company information management unit 303 in the fields C1 and C2.

In addition, the user interface 304 may be configured to display the main dish among the recommended dishes determined by the dish proposal unit 302 in the field C3, and to display a side dish among the recommended dishes determined by the dish proposal unit 302 in the field C4. Although not illustrated, the user interface 304 may be configured to display a soup out of the recommended dishes determined by the dish proposal unit 302.

Here, the user interface 304 may be configured to display only side dishes matching the main dish selected by the user 10 in the field C3 in the field C4. Although not illustrated, the user interface 304 may be configured to display only a soup matching the main dish selected by the user 10 in the field C3.

The reservation information management unit 305 is configured to manage reservation information that is information related to the reservation of the present service by the user 10 using the terminal 20.

Specifically, as illustrated in FIG. 18, the reservation information management unit 305 is configured to manage at least "selected date and time information", "selected space information", "selected dish information (main dish)", "selected dish information (side dish)", and "content information" in association with each other as the reservation information for each user 10.

Here, the "selected date and time information" is information indicating the selected date and time selected by the user 10 from among the designated date and time designated by the company 200 as the date and time (for example, available time zone or the like) at which the user 10 desires to use the present service.

The "selected space information" is information indicating a selected space selected by the user 10 from among the designated space designated by the company 200 as a space (for example, a meeting room, a working room, a rental space, or the like) of the company 200 in which the user 10 desires to use the present service.

The "selected dish information (main dish)" is information indicating the main dish (the main dish selected by the user 10 in the field C3 on the user reservation screen) that the user 10 desires to make in the selected space indicated by the "selected space information" at the selected date and time indicated by the "selected date and time information".

The "selected dish information (side dish)" is information indicating the main dish (the side dish selected by the user 10 in the field C4 on the user reservation screen) that the user 10 desires to make in the selected space indicated by the "selected space information" at the selected date and time indicated by the "selected date and time information" described above.

The "content information" is content identification information for identifying content corresponding to the recipe of the dish (the main dish and the side dish) indicated by the "selected dish information (main dish)" and the "selected dish information (side dish)".

The reservation information management unit 305 may be configured to further manage other information as the reservation information.

The order placement unit 306 is configured to order seasoning together with the ingredients of the above-described dish.

For example, the order placement unit 306 may be configured to order the seasoning in consideration of the storage information, the constraint information, and the like of the designated space described above.

That is, the order placement unit 306 may be configured to order the seasoning from the food manufacturer 400, not every day but at a predetermined time before the stock becomes insufficient in the designated space described above.

Specifically, the order placement unit 306 is configured to order at least one of the ingredients and seasoning necessary for making the dish corresponding to the recipe on the basis of the recipe of the dish proposed by the dish proposal unit 302 and selected by each user 10.

Here, the order placement unit 306 may be configured to determine, for each user 10, the order amounts of a shrink-proofing agent and the seasoning for each user 10 on the basis of the "selected dish information (main dish)", the "selected dish information (side dish)", and the like included in the reservation information described above.

Note that the order placement unit 306 may be configured to order ingredients for the user 10 scheduled to cook at the selected date and time a predetermined period before the selected date and time.

The above-described order may be placed by e-mail or FAX via a network, may be placed in the form of input to a prescribed format in a server or the like managed by the distributor 300 or the food manufacturer 400, or may be placed by voice call.

The content distribution unit 307 is configured to refer to the user information managed by the user information management unit 301 and the reservation information managed by the reservation information management unit 305, and distribute the content identified by the "content information" associated with the "selected date and time information" to a mail address or the like indicated in the "address information" associated with the "user ID" of each user 10 before the selected date and time set in the "selected date and time information".

Here, the content may be a moving image or audio indicating how to make a dish corresponding to each recipe, or may include a text, a photograph, an image (still image), a picture, or the like describing how to make such a dish.

Note that the content delivery unit 307 may be configured to deliver content acquired from the outside, or may be configured to deliver content input by the administrator of the management server 100.

Furthermore, the content distribution unit 307 may be configured to refer to the cooking utensil information management unit 309 and the reservation information management unit 305 to determine the order of making each of the dishes in the combination of the dishes selected by the user 10, and recommend the order in the content to be distributed to the user 10.

Here, the order of making each of the dishes may be the order of making the main dish and the side dish.

Furthermore, in a case where a plurality of users makes a dish in the selected space at a specific selected date and time, the content distribution unit 307 may be configured to change the order among the plurality of users.

According to such a configuration, a limited number of cooking utensils can be used without overlapping among the plurality of users, and cooking can be completed within a selected time.

The delivery arrangement unit 308 is configured to arrange for the delivery company 500 delivery of the dish made by the user 10 on the basis of a delivery request from the user 10.

The such delivery arrangement may be made by electronic mail or FAX via a network, may be made in the form of input to a prescribed format in a server or the like managed by the delivery company 500, or maybe made by voice call.

An example of the operation of the management server 100 according to the present embodiment will be described below with reference to FIG. 19.

Figure 19:
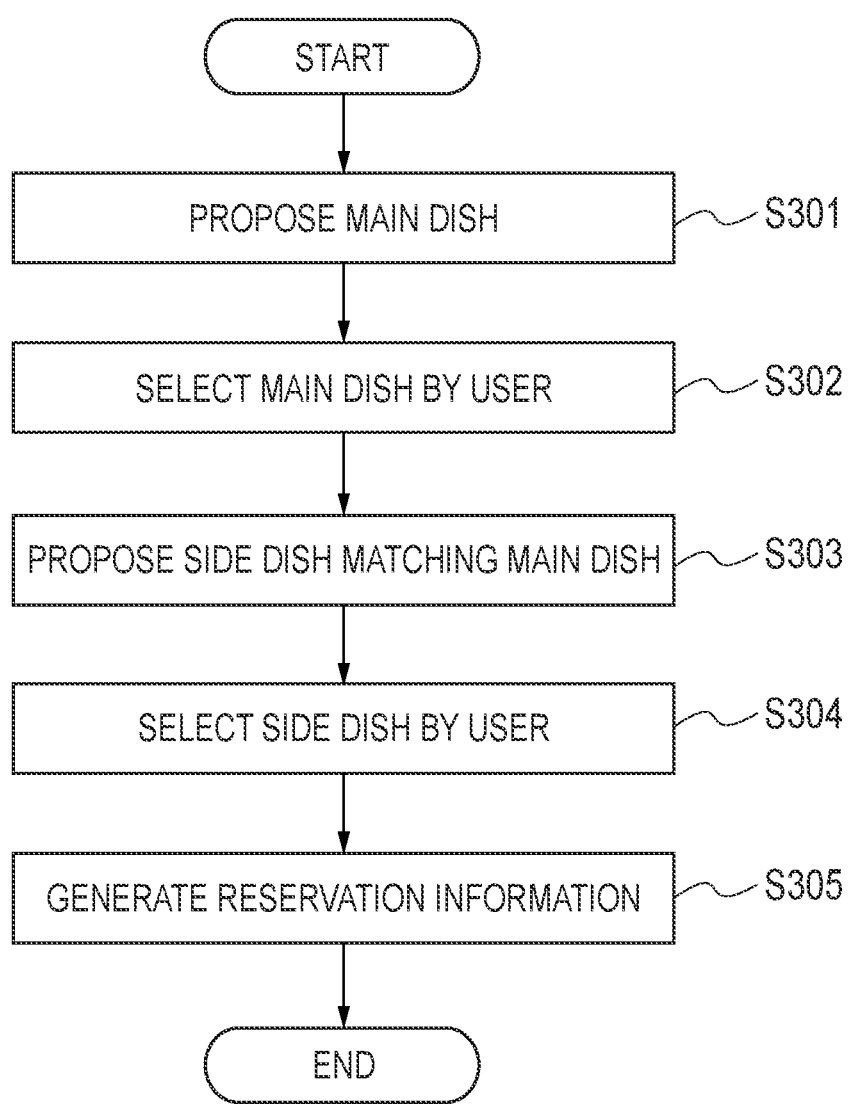
FIG. 19 is a flowchart illustrating an example of an operation of the management server 100 according to the fourth embodiment.

As illustrated in FIG. 19, in step S301, the dish proposal unit 302 of the management server 100 according to the present embodiment determines a recommended dish (a combination of main dishes and side dishes matching the main dishes) for each user 10 on the basis of the cooking utensil information and the like described above, and the user interface 304 of the management server 100 displays the plurality of determined main dishes in the field C3 of the user reservation screen.

When the user 10 selects one main dish from the plurality of main dishes in the field C3 of the user reservation screen in step S302, the user interface 304 displays a side dish matching the main dish selected by the user 10 in the field C4 of the user reservation screen in step S303.

In step S304, the user 10 selects one or more side dishes from the plurality of side dishes in the field C3 of the user reservation screen.

When the reservation via the user reservation screen by the user 10 is completed in step S305, the reservation information management unit 305 generates and manages the reservation information on the basis of the result of input to the user reservation screen by the user 10.

According to the service providing system 1 according to the present embodiment, by renting a space of the company 200, it is possible to make a dish in a spare time during a moving time or a working time of the user 10, and moreover, a troublesome recipe is devised by the management server 100 as a substitute. Therefore, in a busy dual-income household (in particular, a double-income parenting household), it is possible to increase the time for communication (in particular, communication with children) between family members, and it is also possible to secure own time.

In addition, according to the service providing system 1 according to the present embodiment, since the user 10 himself/herself can cook in the spare time during the moving time or working time of the user 10, it is possible to eliminate the guilt of not cooking by himself/herself while reducing the cost as compared with the case of using home-meal replacement or a home-delivered meal.

Furthermore, according to the service providing system 1 according to the present embodiment, the user 10 can cook without being conscious of the purchase of ingredients, seasonings, and the like, maintenance of cooking utensils, and tidying and cleaning of a kitchen after cooking at home.

In addition, according to the service providing system 1 according to the present embodiment, a limited number of available cooking utensils arranged in a space for cooking can be effectively used among a plurality of users.

That is, according to the service providing system 1 according to the present embodiment, even in a case where the number of users who make a dish at the same time is larger than the number of cooking utensils, the waiting time for using the cooking utensil can be reduced and cooking can be completed within the selected time by sorting the plurality of users based on the order of making the dish (sorting the users into a user who makes the dish in order from the main dish to the side dish and a user who makes the dish in order from the side dish to the main dish).

Fifth Embodiment

A fifth embodiment of the present invention will be described below focusing on differences from the above-described first to fourth embodiments with reference to FIGS. 1, 10, 15, and 20 to 23.

As illustrated in FIG. 1, the service providing system 1, according to the present embodiment includes a terminal 20, a management server 100, a company 200, a distributor 300, a food manufacturer 400, and a delivery company 500.

Figure 20:
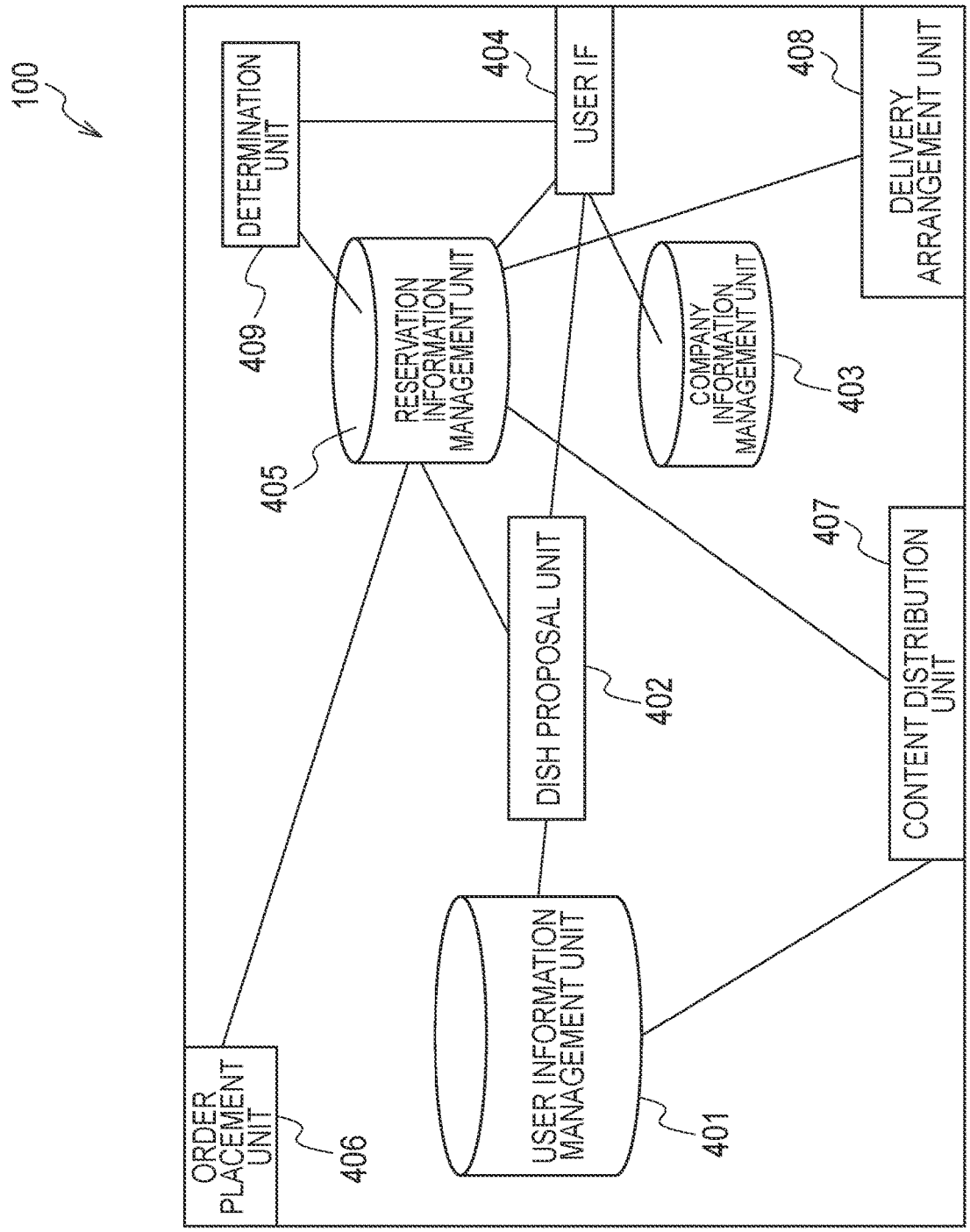
FIG. 20 is a diagram illustrating an example of functional blocks of the management server 100 according to the fifth and sixth embodiments.

As illustrated in FIG. 20, the management server 100 includes a user information management unit 401, a dish proposal unit 402, a company information management unit 403, a user interface (IF) 404, a reservation information management unit 405, an order placement unit 406, a content distribution unit 407, a delivery arrangement unit 408, and a determination unit 409. Here, the management server 100 may not include the delivery arrangement unit 408.

The user information management unit 401 is configured to manage user information which is information related to each user 10 registered as a member of the present service. Here, the user information management unit 401 is configured to generate user information of each user 10 on the basis of information input by the terminal 20 of the user 10.

For example, as illustrated in FIG. 15, the user information management unit 401 is configured to manage at least a "user ID", "address information", and "profile information" in association with each other as the user information for each user 10.

Here, the "user ID" is information for identifying the user 10.

The "address information" is the address information of a transmission destination of content designated by the user 10. For example, as illustrated in FIG. 15, a mail address or the like of the terminal 20 of the user 10 may be set in the "address information".

The "profile information" is information related to the profile of the user 10. For example, the date of birth, gender, family structure, food preferences, allergy information, and presence or absence of a medical history of the user 10, a company in which the user 10 works, the desired use form and the like of the user 10 may be set in the "profile information".

Here, the desired use form and the like are information related to the use form that the user 10 desires to use. As the desired use form, information for designating a budget, selection of a scene of eating a dish (in the case of eating the dish in the office, in the case of taking the dish home and eating it, or in both cases), a menu intention, or the like may be set.

Note that the menu intention is information indicating a plan prepared for each purpose of the user 10. For example, in the menu intention, a meal prep plan assuming freezing or the like, a plan for children (for example, for a person who wants to cook baby food, infant food, or the like), a standard dish plan (for those who emphasize the balance of the entire menu, and the like), a health plan (for those who intend to diet, and the like), and the like may be set.

Furthermore, taste preference information that is information indicating the taste preferences of the user 10 may be set in the "profile information".

Note that, although not illustrated, the user information management unit 401 may be further configured to manage, as the user information, a use history or the like which is information related to use history of the present service by the user 10. For example, in the use history, information such as the date and time when the user 10 has used the present service, the type of a dish made at that time, a recipe of the dish made at that time, and the like may be set.

The company information management unit 403 is configured to manage company information that is information related to the company 200 that agrees to provide the present service.

For example, the company information management unit 403 is configured to manage at least "designated date and time information", "designated space information", and "providing place information" in association with each other as the company information for each company 200 as illustrated in FIG. 21.

Here, the "designated date and time information" is information indicating a designated date and time designated as a date and time providable by the company 200. Note that the "designated date and time information" may be set to include a time designated as a time that can be provided by the company 200 in addition to the information indicating the designated date and time (for example, 12:00 to 13:00 or the like).

Furthermore, the "designated space information" is information indicating a designated space (for example, a meeting room, a working room, a rental space, or the like) designated as a space providable by the company 200 at the designated date and time set in the "designated date and time information".

The "providing place information" may be configured to manage to provide place information or the like which is information related to the designated space set in the "designated space information".

For example, as illustrated in FIG. 21, the "providing place information" includes "constraint information", "storage information", "size information", and the like.

Here, the "constraint information" is constraint information regarding use of the designated space set in the "designated space information", and includes constraint information regarding equipment in the designated space, constraint information regarding environment maintenance of the designated space, constraint information regarding the maintenance of cooking utensils for cooking in the designated space, and the like.

For example, the constraint information regarding the equipment in the designated space includes limitations regarding the availability of each equipment for electricity, water, gas, ventilation, and the like and usage of each equipment, and the like in the designated space.

In the example of FIG. 21, the "constraint information" includes "cooling space information" as the constraint information regarding the equipment in the designated space. Here, the "cooling space information" is information related to an empty space of a cooling device provided in a predetermined place corresponding to the designated space.

Here, for example, in a case where the designated space is a large meeting room, or the like, the predetermined place corresponding to the designated space may be the designated space itself. In a case where the designated space is a normal meeting room, or the like, the predetermined place corresponding to the designated space may be an office room, a rest space, or the like near the designated space. Furthermore, the cooling device may be a device having the functions of a refrigerator, a freezer, or both the freezer and the refrigerator.

Furthermore, for example, the constraint information regarding the environment maintenance of the designated space includes a limitation (for example, a limitation on the environment of the designated space in which it is not preferable that an aroma derived from an ingredient or a dish remains, and the like) regarding the environment maintenance of the designated space after cooking.

Furthermore, for example, the constraint information regarding the maintenance of the cooking utensils for cooking in the designated space includes a limitation (for example, a limitation on ingredients and dishes that are difficult to wash, and the like) regarding maintenance such as cleaning of the cooking utensils.

The "storage information" is information regarding ingredients, seasonings, and the like, cooking utensils, and the like stored for the designated space set in the "designated space information".

The "size information" is information indicating the size of the designated space set in the "designated space information".

The dish proposal unit 402 is configured to determine a recommended dish for each user 10 on the basis of the user information managed by the user information management unit 401.

For example, the dish proposal unit 402 may be configured to determine a recommended dish for the user 10 on the basis of a family structure, allergy information, or the like of the user 10, a past use record of the user 10, a desired use form of the user 10, and the like.

Here, the dish proposal unit 402 may be configured to propose, to each user 10, a recommended dish for the user 10 for a predetermined period (for example, one month or one week).

In addition, the recommended dish is preferably a dish that can be made during a break time such as early morning or a lunch break, or during a spare time such as after hours or lunchtime. For example, the recommended dish is preferably a dish that can be made in a predetermined time (for example, 10 minutes to 20 minutes).

Furthermore, the dish proposal unit 402 may be configured to propose the same recommended dish for a group including a plurality of users 10 at the same date and time (time zone) in the same space. In such a case, the dish proposal unit 402 may be configured to determine the recommended dish on the basis of the number of users in the group.

Furthermore, the dish proposal unit 402 may be further configured to determine a recommended dish for each user 10 with reference to company information managed by the company information management unit 403.

For example, the dish proposal unit 402 may be further configured to determine a recommended dish for each user 10 with reference to constraint information of a space that can be designated by the company 200 in which the user 10 works.

Moreover, the dish proposal unit 402 may be configured to select a recommended dish for the user 10 by a predetermined method from among a plurality of recommended dishes stored by the management server 100.

For example, the dish proposal unit 402 may be configured to select a recommended dish for each user 10 by using a learning model obtained by machine learning of a correlation between the "profile information" of the user 10 and a recommended dish.

Note that the recipes of the plurality of recommended dishes stored by the management server 100 may be provided by a cook or the like having a cooperative relationship with the present service. Here, the dish proposal unit 402 may be configured to select a plurality of recommended dishes as the recommended dishes for each user 10.

The determination unit 409 is configured to determine the number of available users indicating the number of remaining users who can make a dish in the designated space at the designated date and time or an available amount indicating a remaining amount sufficient to be able to make the dish in the designated space at the designated date and time on the basis of the reservation information (described later) and the company information.

For example, the determination unit 409 may be configured to calculate the number of reserved users indicating how many users have already made a reservation for each designated space at each designated date and time with reference to the reservation information management unit 405 to be described later, compare the number of reserved users with the maximum number of available users defined for each designated space, and calculate the number of available users in each designated space at each designated date and time.

Alternatively, the determination unit 409 may be configured to calculate a reservation amount indicating how many people have already made a reservation for cooking in each designated space at each designated date and time with reference to the reservation information management unit 405 to be described later, compare the reservation amount with the maximum available amount defined for each designated space, and calculate the available amount in each designated space at each designated date and time.

Here, the determination unit 409 may be configured to determine the above-described number of available users or the above-described available amount on the basis of the above-described cooling space information.

For example, the determination unit 409 may be configured to define the maximum number of available users and the maximum available amount on the basis of the above-described cooling space information.

Note that, in the present service, a case is assumed in which a dish made at a designated time is taken home after work end time, and in such a case, it is necessary to store the dish in a freezer until the work end time after the dish is rapidly frozen.

In addition, in the present service, ingredients delivered by the distributor 300 need to be stored in a refrigerator (alternatively, a freezer) until the above-described selected time.

Therefore, for example, the determination unit 409 may be configured to define the maximum number of available users and the maximum available amount as the cooling space information on the basis of at least one of information regarding the empty space of the freezer and information regarding the empty space of the refrigerator.

Furthermore, in a case where the user 10 designates whether or not to bring back such a dish at the stage of reservation of the present service, the determination unit 409 may be configured to determine the number of available users or the available amount in consideration of the number of users (alternatively, the amount of the dish) who bring back such a dish.

The user interface 404 serves as an interface configured to communicate with the terminal 20 of the user 10.

Figure 22:
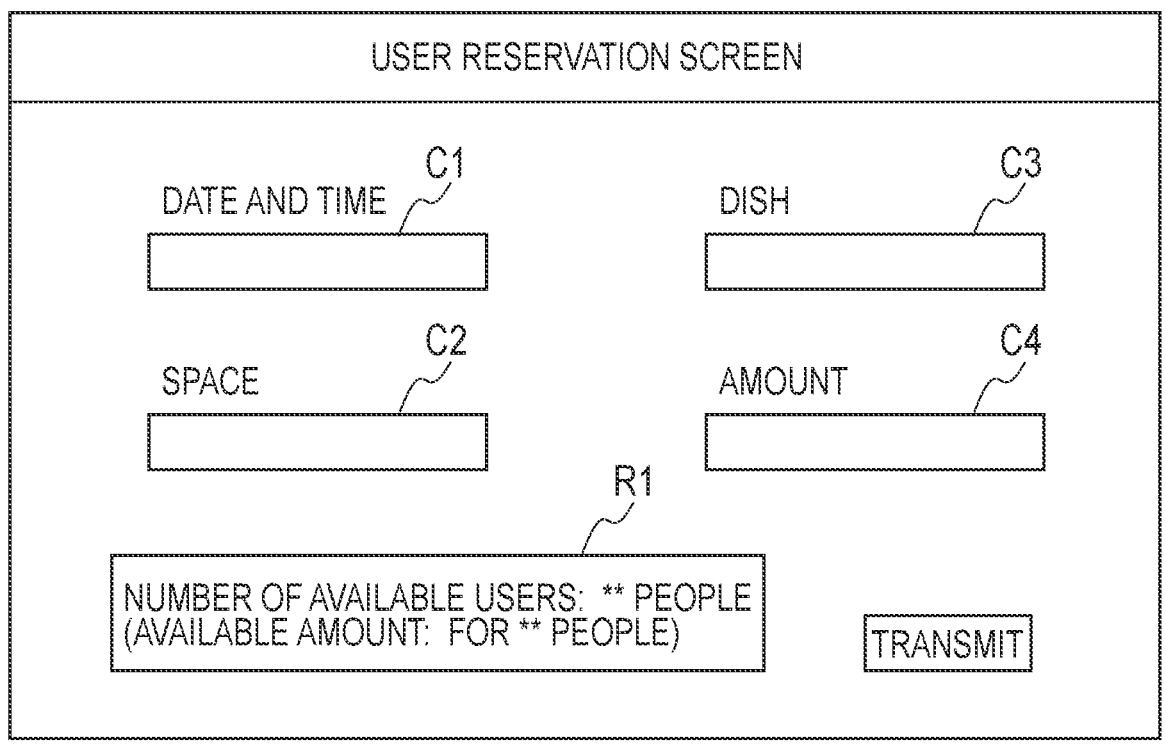
FIG. 22 illustrates an example of a user reservation screen provided by a user interface 404 of the management server 100 according to the fifth embodiment and displayed on the terminal 20 of the user 10.

For example, the user interface 404 may be configured to cause the terminal 20 of the user 10 to display a user reservation screen as illustrated in FIG. 22 in response to a request from the terminal 20 of the user 10.

In a case where the user 10 desires to make a dish using the present service, the user 10 can access the management server 100 using the terminal 20 and reserve the present service on the user reservation screen (see, for example, FIG. 22) provided by the management server 100.

For example, on the user reservation screen, the user 10 can reserve the present service by inputting the desired date and time in a field C1, inputting the desired space in a field C2, inputting the desired dish in a field C3, and inputting the desired amount of dish in a field C4.

Here, the user interface 404 may be configured to display a plurality of input candidates in the fields C1 to C4 on the user reservation screen, and the user 10 may select the desired input candidate from among the plurality of input candidates.

For example, the user interface 404 may be configured to display a combination of the "designated date and time information" and the "designated space information" managed by the company information management unit 403 in the fields C1 and C2.

In addition, the user interface 404 may be configured to display a plurality of recommended dishes determined by the dish proposal unit 402 in the field C3.

Here, the user interface 404 is configured to notify the user 10 of the number of available users or the available amount determined by the determination unit 409.

For example, as illustrated in FIG. 22, the user interface 404 may be configured to display the number of available users or the available amount (region R1) together with the recommended dish (field C3) on the user reservation screen.

Here, in a case where the above-described number of reserved users has reached the maximum number of available users or the above-described reserved amount has reached the maximum available amount in the designated space at a specific designated date and time, the user interface 404 may be configured to display that the designated space at the designated date and time cannot be reserved on the user reservation screen.

In addition, the user interface 404 may be able to input only an amount equal to or less than the available amount in the field C4 on the user reservation screen.

The reservation information management unit 405 is configured to manage reservation information that is information related to the reservation of the present service by the user 10 using the above-described terminal 20.

Specifically, as illustrated in FIG. 10, the reservation information management unit 405 is configured to manage at least "selected date and time information", "selected space information", "selected dish information", "amount information", and "content information" in association with each other as the reservation information for each user 10.

Here, the "selected date and time information" is information indicating the selected date and time selected by the user 10 from among the designated date and time designated by the company 200 as the date and time (for example, available time zone or the like) at which the user 10 desires to use the present service.

The "selected space information" is information indicating a selected space selected by the user 10 from among the designated space designated by the company 200 as a space (for example, a meeting room, a working room, a rental space, or the like) of the company 200 in which the user 10 desires to use the present service.

The "selected dish information" is information indicating the dish (the selected dish selected by user 10 in the field C3 on the user reservation screen) that the user 10 desires to make in the selected space indicated by the "selected space information" at the selected date and time indicated by the "selected date and time information" described above.

The "amount information" is information indicating how many people the user 10 wants to make the dish indicated by "selected dish information".

The "content information" is content identification information for identifying the content corresponding to the recipe of the dish indicated by the "selected dish information."

The reservation information management unit 405 may be configured to further manage other information as the reservation information.

The order placement unit 406 is configured to order seasoning together with the ingredients of the above-described dish.

For example, the order placement unit 406 may be configured to order the seasoning in consideration of the storage information, the constraint information, and the like of the designated space described above.

That is, the order placement unit 406 may be configured to order the seasoning from the food manufacturer 400 not every day but at a predetermined time before the stock becomes insufficient in the designated space described above.

Specifically, the order placement unit 406 is configured to order at least one of the ingredients and seasoning necessary for making the dish corresponding to the recipe on the basis of the recipe of the dish proposed by the dish proposal unit 402 and selected by each user 10.

Note that the order placement unit 406 may be configured to order ingredients for the user 10 scheduled to cook at the selected date and time a predetermined period before the selected date and time.

The above-described order may be placed by e-mail or FAX via a network, may be placed in the form of input to a prescribed format in a server or the like managed by the distributor 300 or the food manufacturer 400, or may be placed by voice call.

The content distribution unit 407 is configured to refer to the user information managed by the user information management unit 401 and the reservation information managed by the reservation information management unit 405, and distribute the content identified by the "content information" associated with the "selected date and time information" to a mail address or the like indicated in the "address information" associated with the "user ID" of each user 10 before the selected date and time set in the "selected date and time information".

Here, the content may be a moving image or audio indicating how to make a dish corresponding to each recipe, or may include a text, a photograph, an image (still image), a picture, or the like describing how to make such a dish.

Note that the content delivery unit 407 may be configured to deliver content acquired from the outside, or may be configured to deliver content input by the administrator of the management server 100.

The delivery arrangement unit 408 is configured to arrange for the delivery company 500 delivery of the dish made by the user 10 on the basis of a delivery request from the user 10.

The such delivery arrangement may be made by electronic mail or FAX via a network, may be made in the form of input to a prescribed format in a server or the like managed by the delivery company 500, or maybe made by voice call.

Figure 23:
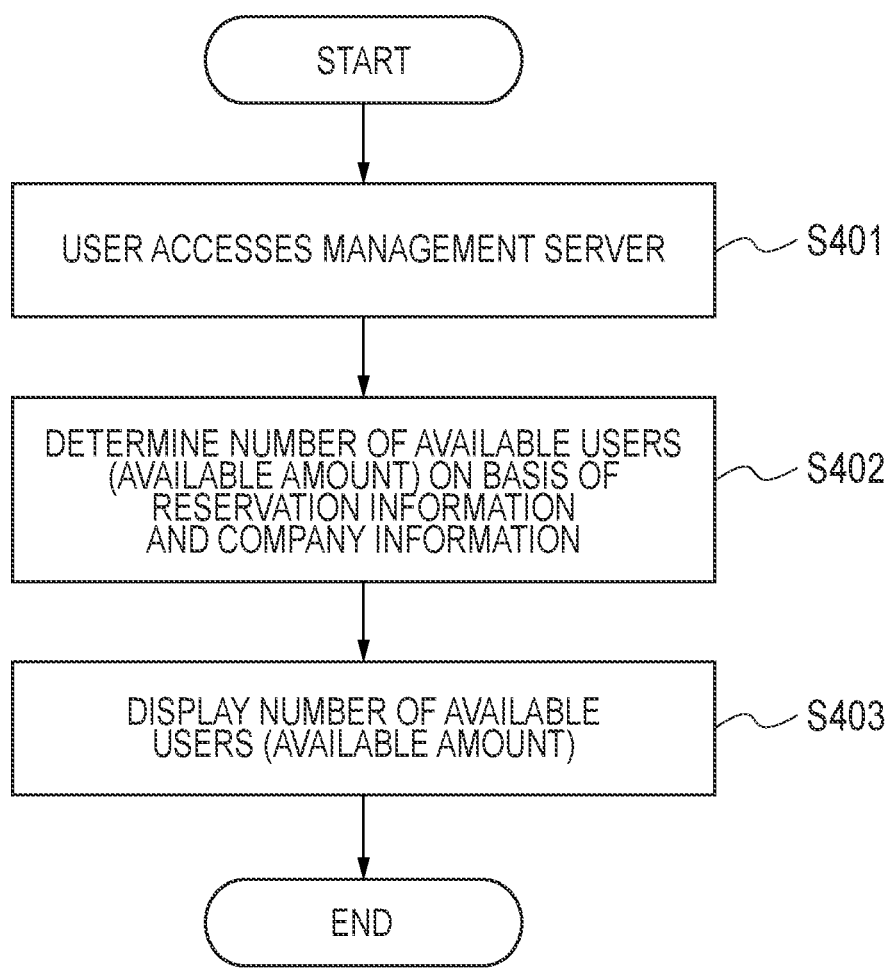
FIG. 23 illustrates an example of an operation of the management server 100 according to the fifth embodiment.

An example of the operation of the management server 100 according to the present embodiment will be described below with reference to FIG. 23.

As illustrated in FIG. 7, in step S401, when the user 10 accesses the management server 100 according to the present embodiment and attempts to reserve the present service in the designated space at a specific designated date and time, in step S402, the determination unit 409 of the management server 100 determines the number of available users or the available amount in the designated space at the designated date and time on the basis of the above-described reservation information and the company information, and in step S403, the user interface 404 of the management server 100 displays the number of available users or the available amount on the user reservation screen.

According to the service providing system 1 according to the present embodiment, by renting a space of the company 200, it is possible to make a dish in a spare time during a moving time or a working time of the user 10, and moreover, a troublesome recipe is devised by the management server 100 as a substitute. Therefore, in a busy dual-income household (in particular, a double-income parenting household), it is possible to increase the time for communication (in particular, communication with children) between family members, and it is also possible to secure own time.

In addition, according to the service providing system 1 according to the present embodiment, since the user 10 himself/herself can cook in the spare time during the moving time or working time of the user 10, it is possible to eliminate the guilt of not cooking by himself/herself while reducing the cost as compared with the case of using home-meal replacement or a home-delivered meal.

Furthermore, according to the service providing system 1 according to the present embodiment, the user 10 can cook without being conscious of the purchase of ingredients, seasonings, and the like, maintenance of cooking utensils, and tidying and cleaning of a kitchen after cooking at home.

Furthermore, according to the service providing system 1 according to the present embodiment, it is possible to limit the number of users permitted to use the present service or the amount of the dish on the basis of constraints in each designated space.

For example, according to the service providing system 1 according to the present embodiment, it is possible to limit the number of users who are permitted to use the present service or the amount of a dish on the basis of the number of users (alternatively, the amount of the dish) who bring the dish made at the designated time to their home after the work end time and empty space of a freezer or a refrigerator installed in a predetermined place corresponding to each designated space.

Sixth Embodiment

A sixth embodiment of the present invention will be described below focusing on differences from the above-described first to fifth embodiments with reference to FIGS. 1, 9, 10, 15, 20, 24, and 25.

As illustrated in FIG. 1, the service providing system 1 according to the present embodiment includes a terminal 20, a management server 100, a company 200, a distributor 300, a food manufacturer 400, and a delivery company 500.

As illustrated in FIG. 20, the management server 100 includes a user information management unit 401, a dish proposal unit 402, a company information management unit 403, a user interface (IF) 404, a reservation information management unit 405, an order placement unit 406, a content distribution unit 407, a delivery arrangement unit 408, and a determination unit 409. Here, the management server 100 may not include the delivery arrangement unit 408.

The user information management unit 401 is configured to manage user information which is information related to each user 10 registered as a member of the present service. Here, the user information management unit 401 is configured to generate user information of each user 10 on the basis of information input by the terminal 20 of the user 10.

For example, as illustrated in FIG. 15, the user information management unit 401 is configured to manage at least a "user ID", "address information", and "profile information" in association with each other as the user information for each user 10.

Here, the "user ID" is information for identifying the user 10.

The "address information" is the address information of a transmission destination of content designated by the user 10. For example, as illustrated in FIG. 15, a mail address or the like of the terminal 20 of the user 10 may be set in the "address information".

The "profile information" is information related to the profile of the user 10. For example, the date of birth, gender, family structure, food preferences, allergy information, and presence or absence of a medical history of the user 10, a company in which the user 10 works, the desired use form and the like of the user 10 may be set in the "profile information".

Here, the desired use form and the like are information related to the use form that the user 10 desires to use. As the desired use form, information for designating a budget, selection of a scene of eating a dish (in the case of eating the dish in the office, in the case of taking the dish home and eating it, or in both cases), a menu intention, or the like may be set.

Note that the menu intention is information indicating a plan prepared for each purpose of the user 10. For example, in the menu intention, a meal prep plan assuming freezing or the like, a plan for children (for example, for a person who wants to cook baby food, infant food, or the like), a standard dish plan (for those who emphasize the balance of the entire menu, and the like), a health plan (for those who intend to diet, and the like), and the like may be set.

Furthermore, taste preference information that is information indicating the taste preferences of the user 10 may be set in the "profile information".

Note that, although not illustrated, the user information management unit 401 may be further configured to manage, as the user information, a use history or the like which is information related to a use history of the present service by the user 10. For example, in the use history, information such as the date and time when the user 10 has used the present service, the type of a dish made at that time, a recipe of the dish made at that time, and the like may be set.

The company information management unit 403 is configured to manage company information that is information related to the company 200 that agrees to provide the present service.

For example, the company information management unit 403 is configured to manage at least "designated date and time information", "designated space information", and "providing place information" in association with each other as the company information for each company 200 as illustrated in FIG. 24.

Here, the "designated date and time information" is information indicating a designated date and time designated as a date and time providable by the company 200. Note that the "designated date and time information" may be set to include a time designated as a time that can be provided by the company 200 in addition to the information indicating the designated date and time (for example, 12:00 to 13:00 or the like).

Furthermore, the "designated space information" is information indicating a designated space (for example, a meeting room, a working room, a rental space, or the like) designated as a space providable by the company 200 at the designated date and time set in the "designated date and time information".

The "providing place information" may be configured to manage to provide place information or the like which is information related to the designated space set in the "designated space information".

For example, as illustrated in FIG. 24, the "providing place information" includes "constraint information", "storage information", "size information", and the like.

Here, the "constraint information" is constraint information regarding use of the designated space set in the "designated space information", and includes constraint information regarding equipment in the designated space, constraint information regarding environment maintenance of the designated space, constraint information regarding the maintenance of cooking utensils for cooking in the designated space, and the like.

For example, the constraint information regarding the equipment in the designated space includes limitations regarding the availability of each equipment for electricity, water, gas, ventilation, and the like and usage of each equipment, and the like in the designated space.

Furthermore, for example, the constraint information regarding the environment maintenance of the designated space includes a limitation regarding the environment maintenance of the designated space after cooking.

In the example of FIG. 24, the "constraint information" includes "odor information" as the constraint information regarding the environment maintenance of the designated space. Here, the "odor information" is information indicating whether or not it is not preferable for an odor caused by an ingredient or a dish to remain in the designated space. For example, when "○" is set in the "odor information", it indicates that the odor caused by the ingredient or dish may be accepted to remain in the designated space, and when "x" is set in the "odor information", it indicates that it is not preferable that the odor caused by the ingredient or dish remains in the designated space.

Furthermore, for example, the constraint information regarding the maintenance of the cooking utensils for cooking in the designated space includes a limitation (for example, a limitation on ingredients and dishes that are difficult to wash, and the like) regarding maintenance such as cleaning of the cooking utensils.

The "storage information" is information regarding ingredients, seasonings, and the like, cooking utensils, and the like stored for the designated space set in the "designated space information".

The "size information" is information indicating the size of the designated space set in the "designated space information".

The dish proposal unit 402 is configured to determine a recommended dish for each user 10 on the basis of the user information managed by the user information management unit 401.

For example, the dish proposal unit 402 may be configured to determine a recommended dish for the user 10 on the basis of a family structure, allergy information, or the like of the user 10, a past use record of the user 10, a desired use form of the user 10, and the like.

Here, the dish proposal unit 402 may be configured to propose, to each user 10, a recommended dish for the user 10 for a predetermined period (for example, one month or one week).

In addition, the recommended dish is preferably a dish that can be made during a break time such as early morning or a lunch break, or during a spare time such as after hours or lunchtime. For example, the recommended dish is preferably a dish that can be made in a predetermined time (for example, 10 minutes to 20 minutes).

Furthermore, the dish proposal unit 402 may be configured to propose the same recommended dish for a group including a plurality of users 10 at the same date and time (time zone) in the same space. In such a case, the dish proposal unit 402 may be configured to determine the recommended dish on the basis of the number of users in the group.

Furthermore, the dish proposal unit 402 may be further configured to determine a recommended dish for each user 10 with reference to company information managed by the company information management unit 403.

For example, the dish proposal unit 402 may be further configured to determine a recommended dish for each user 10 with reference to constraint information of a space that can be designated by the company 200 in which the user 10 works.

Moreover, the dish proposal unit 402 may be configured to select a recommended dish for the user 10 by a predetermined method from among a plurality of recommended dishes stored by the management server 100.

For example, the dish proposal unit 402 may be configured to select a recommended dish for each user 10 by using a learning model obtained by machine learning of a correlation between the "profile information" of the user 10 and a recommended dish.

Note that the recipes of the plurality of recommended dishes stored by the management server 100 may be provided by a cook or the like having a cooperative relationship with the present service. Here, the dish proposal unit 402 may be configured to select a plurality of recommended dishes as the recommended dishes for each user 10.

The determination unit 409 is configured to determine the type of dish that can be made in each designated space at each designated date and time on the basis of the constraint information described above with reference to the company information management unit 403.

Here, for example, such dishes may be classified into a "dish to be made with a pattern to cook to the end" and a "dish to be made with a pattern only to freeze pre-seasoned food".

Such dishes may be classified into a "dish that gives off an odor" and a "dish that does not give off an odor".

Alternatively, such dishes may be classified into a "dish to be made using a cooking utensil" and a "dish to be made without a cooking utensil".

Specifically, the determination unit 409 may be configured to determine the type of dish that can be made in each designated space at each designated date and time on the basis of constraint information (for example, the "odor information" illustrated in FIG. 4) regarding environment maintenance of each designated space.

For example, as the type of dish that can be made in the designated space is set in the "designated space information" in which "x" is set in the "odor information", the determination unit 409 may determine to make only a dish classified as a "dish that does not give an odor".

Alternatively, as the type of dish that can be made in the designated space is set in the "designated space information" in which "x" is set in the "odor information", the determination unit 409 may determine to make only a dish classified as a "dish to be made with a pattern only to freeze pre-seasoned food".

Alternatively, the determination unit 409 may be configured to determine the type of dish that can be made in each designated space at each designated date and time on the basis of information ("size information" illustrated in FIG. 24) indicating the size of each designated space.

For example, as the type of dish that can be made in the designated space set in the "designated space information" in which the size set in the "size information" is equal to or smaller than a predetermined area, the determination unit 409 may determine to make only a dish classified as a "dish to be made without a cooking utensil".

Alternatively, as the type of dish that can be made in the designated space set in the "designated space information" in which the size set in the "size information" is equal to or smaller than the predetermined area, the determination unit 409 may determine to make only a dish classified as a "dish to be made with a pattern only to freeze pre-seasoned food".

The user interface 404 serves as an interface configured to communicate with the terminal 20 of the user 10.

For example, the user interface 404 may be configured to cause the terminal 20 of the user 10 to display the user reservation screen as illustrated in FIG. 9 in response to a request from the terminal 20 of the user 10.

In a case where the user 10 desires to make a dish using the present service, the user can access the management server 100 using the terminal 20 and reserve the present service on the user reservation screen (see, for example, FIG. 9) provided by the management server 100.

For example, on the user reservation screen, the user 10 can reserve the present service by inputting the desired date and time in a field C1, inputting the desired space in a field C2, inputting the desired dish in a field C3, and inputting the desired amount of dish in a field C4.

Here, the user interface 404 may be configured to display a plurality of input candidates in the fields C1 to C4 on the user reservation screen, and the user 10 may select the desired input candidate from among the plurality of input candidates.

For example, the user interface 404 may be configured to display a combination of the "designated date and time information" and the "designated space information" managed by the company information management unit 403 in the fields C1 and C2.

In addition, the user interface 404 may be configured to display a plurality of recommended dishes determined by the dish proposal unit 402 in the field C3.

Here, the user interface 404 is configured to limit the types of dishes that can be selected by the user 10 in each designated space at each designated date and time on the user reservation screen on the basis of the type of dish determined by the determination unit 409.

The user interface 404 may be configured to display only the dish of the type determined by the determination unit 409 in a field C3 ("dish") on the user reservation screen illustrated in FIG. 9.

For example, in a case where the determination unit 409 determines to set only a dish classified as a "dish to be made with a pattern only to freeze pre-seasoned food" as the type of dish that can be made in the target designated space, the user interface 404 may be configured to display only the dish belonging to the "dish to be made with a pattern only to freeze pre-seasoned food" in the column C3 ("dish") on the user reservation screen illustrated in FIG. 9.

Furthermore, in a case where the determination unit 409 determines to use only a dish classified as a "dish that does not give off an odor" as the type of dish that can be made in the target designated space, the user interface 404 may be configured to display only the dish belonging to the "dish that does not give off an odor" in the field C3 ("dish") on the user reservation screen illustrated in FIG. 9.

Furthermore, in a case where the determination unit 409 determines to make only a dish classified as a "dish to be made without a cooking utensil" as the type of dish that can be made in the target designated space, the user interface 404 may be configured to display only the dish belonging to the "dish to be made without a cooking utensil" in the column C3 ("dish") on the user reservation screen illustrated in FIG. 9.

Note that the user interface 404 may be configured to display in the field C3 ("dish") on the user reservation screen illustrated in FIG. 9 so that the user can recognize which one of the "dishes to be made with a pattern to cook to the end" and a "dish to be made with a pattern only to freeze only pre-seasoned food" the dish belongs, and the user 10 can select one of the "dishes to be made with a pattern to cook to the end" and the "dish to be made with a pattern only to freeze pre-seasoned food".

The reservation information management unit 405 is configured to manage reservation information that is information related to the reservation of the present service by the user 10 using the above-described terminal 20.

Specifically, as illustrated in FIG. 10, the reservation information management unit 405 is configured to manage at least "selected date and time information", "selected space information", "selected dish information", "amount information", and "content information" in association with each other as the reservation information for each user 10.

Here, the "selected date and time information" is information indicating the selected date and time selected by the user 10 from among the designated date and time designated by the company 200 as the date and time (for example, available time zone or the like) at which the user 10 desires to use the present service.

The "selected space information" is information indicating a selected space selected by the user 10 from among the designated space designated by the company 200 as a space (for example, a meeting room, a working room, a rental space, or the like) of the company 200 in which the user 10 desires to use the present service.

The "selected dish information" is information indicating the dish (the selected dish selected by user 10 in the field C3 on the user reservation screen) that the user 10 desires to make in the selected space indicated by the "selected space information" at the selected date and time indicated by the "selected date and time information" described above.

The "amount information" is information indicating how many people the user 10 wants to make the dish indicated by "selected dish information".

The "content information" is content identification information for identifying the content corresponding to the recipe of the dish indicated by the "selected dish information."

The reservation information management unit 405 may be configured to further manage other information as the reservation information.

The order placement unit 406 is configured to order seasoning together with the ingredients of the above-described dish.

For example, the order placement unit 406 may be configured to order the seasoning in consideration of the storage information, the constraint information, and the like of the designated space described above.

That is, the order placement unit 406 may be configured to order the seasoning from the food manufacturer 400, not every day but at a predetermined time before the stock becomes insufficient in the designated space described above.

Specifically, the order placement unit 406 is configured to order at least one of the ingredients and seasoning necessary for making the dish corresponding to the recipe on the basis of the recipe of the dish proposed by the dish proposal unit 402 and selected by each user 10.

Note that the order placement unit 406 may be configured to order ingredients for the user 10 scheduled to cook at the selected date and time a predetermined period before the selected date and time.

The above-described order may be placed by e-mail or FAX via a network, may be placed in the form of input to a prescribed format in a server or the like managed by the distributor 300 or the food manufacturer 400, or may be placed by voice call.

The content distribution unit 407 is configured to refer to the user information managed by the user information management unit 401 and the reservation information managed by the reservation information management unit 405, and distribute the content identified by the "content information" associated with the "selected date and time information" to a mail address or the like indicated in the "address information" associated with the "user ID" of each user 10 before the selected date and time set in the "selected date and time information".

Here, the content may be a moving image or audio indicating how to make a dish corresponding to each recipe, or may include a text, a photograph, an image (still image), a picture, or the like describing how to make such a dish.

Note that the content delivery unit 407 may be configured to deliver content acquired from the outside, or may be configured to deliver content input by the administrator of the management server 100.

The delivery arrangement unit 408 is configured to arrange for the delivery company 500 delivery of the dish made by the user 10 on the basis of a delivery request from the user 10.

Such delivery arrangements may be made by electronic mail or FAX via a network, may be made in the form of input to a prescribed format in a server or the like managed by the delivery company 500, or maybe made by voice call.

An example of the operation of the management server 100 according to the present embodiment will be described below with reference to FIG. 25.

Figure 25:
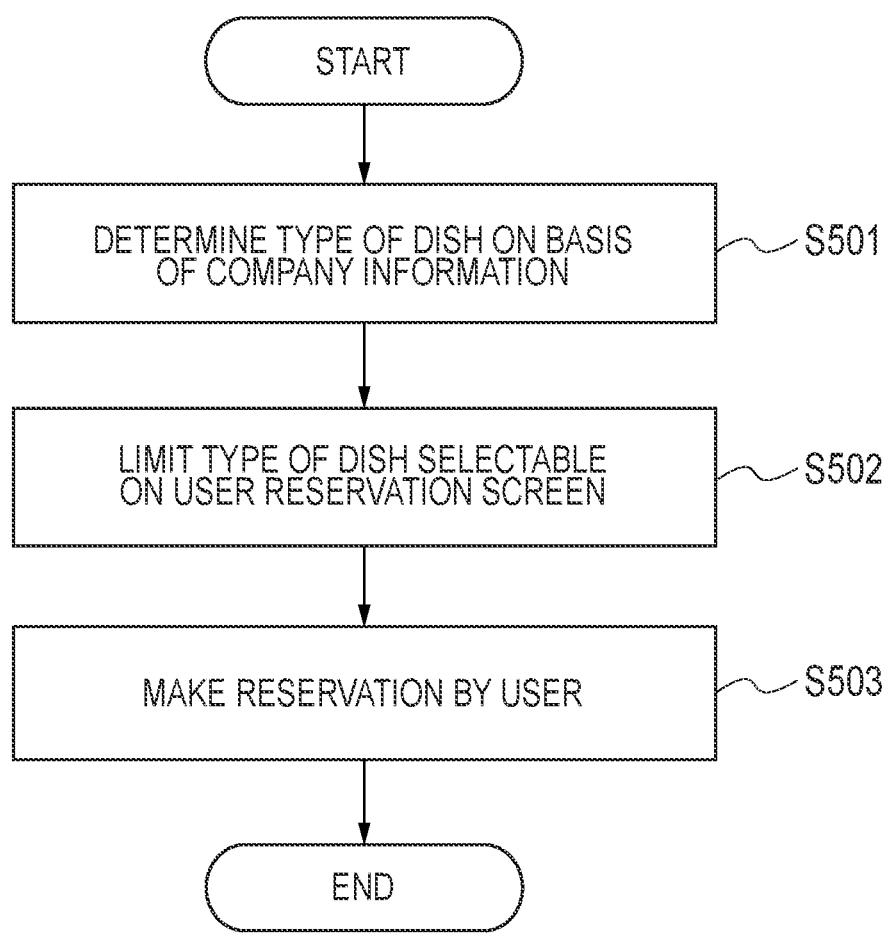
FIG. 25 illustrates an example of an operation of the management server 100 according to the sixth embodiment.

As illustrated in FIG. 25, in step S501, the determination unit 409 of the management server 100 determines the type of dish that can be made in each designated space at each designated date and time on the basis of the company information (for example, "odor information" or "size information") managed by the company information management unit 403.

In step S502, the user interface 404 of the management server 100 limits the types of dishes that can be selected by the user 10 in each designated space at each designated date and time on the user reservation screen on the basis of the type of dish determined by the determination unit 409.

In step S503, the user 10 makes a reservation of the present service on the user reservation screen.

According to the service providing system 1 according to the present embodiment, by renting a space of the company 200, it is possible to make a dish in a spare time during a moving time or a working time of the user 10, and moreover, a troublesome recipe is devised by the management server 100 as a substitute. Therefore, in a busy dual-income household (in particular, a double-income parenting household), it is possible to increase the time for communication (in particular, communication with children) between family members, and it is also possible to secure own time.

In addition, according to the service providing system 1 according to the present embodiment, since the user 10 himself/herself can cook in the spare time during the moving time or working time of the user 10, it is possible to eliminate the guilt of not cooking by himself/herself while reducing the cost as compared with the case of using home-meal replacement or a home-delivered meal.

Furthermore, according to the service providing system 1 according to the present embodiment, the user 10 can cook without being conscious of purchase of ingredients, seasonings, and the like, maintenance of cooking utensils, and tidying and cleaning of a kitchen after cooking at home.

Furthermore, according to the service providing system 1 according to the present embodiment, since the present service can be used even by a company whose kitchenette is extremely narrow or a company that is extremely sensitive to odor, the business scale can be expanded.

In addition, according to the service providing system 1 according to the present embodiment, with respect to a dish belonging to the "dish to be made with a pattern only to freeze pre-seasoning food" and the "dish to be made without a cooking device", a cooking device is hardly used, and there is almost no object to be washed in the designated space. Therefore, the user 10 can make the dish in an extremely short time, and can eat the freshly made dish hot after returning home.

INDUSTRIAL APPLICABILITY

According to the present invention, it is possible to effectively utilize a vacant space in the company 200 and a vacant time of the user 10.

Furthermore, according to the present invention, it is possible to provide the present service as a system that can be continued on a daily basis instead of a one-time basis (once a week, once a month, or the like) as in a cooking class and change the lifestyle of the user 10.

In addition, according to the present invention, it is possible to solve a problem of a household of both husband and wife in which communication with their children and family and own time cannot be secured due to too much time for cooking. The present invention is applicable not only to double-income households but also to health-conscious unmarried women and unmarried men who are particular about diet.

What is claimed is:

1. A management server used in a system that provides a service to a user of a first terminal, the management server being communicably connected to the first terminal and the management server, and the management server comprising:
    a storage which stores:
        user information on the user;
        company information including (i) designated space information regarding at least one designated space designated by a company as a space equipped for cooking by the user, each of the at least one designated space being a space different from a home kitchen of the user, and (ii) constraint information regarding a constraint placed on use of each of the at least one designated space by the user, the constraint information including information on constraints placed on use of cooking equipment and utensils in the designated space, for each of the at least one designated space; and
        a plurality of recipes each corresponding to a respective dish; and
    a hardware processor which, under control of a stored program, executes processes comprising:
        obtaining, from the user via the first terminal, input of reservation information indicating (i) a selected space from among the at least one designated space, and (ii) a selected date and time;
        in response to obtaining the reservation information, outputting a request, based on the stored company information, for use of the selected space at the selected date and time indicated in the reservation information;
        generating confirmation information in response to receiving a response that the selected space is available for use at the selected date and time, the confirmation information being generated based on the reservation information and the company information stored in the storage and including the selected date and time at which the selected space is available for use; and
        in response to generating the confirmation information, automatically:
            determining, based on the user information, the confirmation information, and the company information stored in the storage, a recipe of a dish from among the plurality of recipes, the recipe being a recipe which can be prepared by the user at the selected space at the selected date and time included in the generated confirmation information, under the constraints placed on the selected space at the selected date and time included in the confirmation information;
            in response to determining the recipe, automatically ordering at least one ingredient and a seasoning necessary for making the dish corresponding to the recipe having been determined; and
            transmitting, to the user, content related to preparation of the dish corresponding to the recipe.

2. The management server according to claim 1, wherein the constraint information further includes information on constraints placed on environmental maintenance of the designated space.

3. The management server according to claim 1, wherein the ordering comprises automatically ordering a quantity of the at least one of the ingredients and the seasoning based on a number of users making dishes using a same recipe.

4. The management server according to claim 1, wherein:
    the user information further includes information regarding a necessity of delivery of the dish, and
    the hardware processor, under control of the stored program, further executes a process of arranging delivery of the dish based on the information regarding the necessity of the delivery of the dish.

5. The management server according to claim 1, wherein the hardware processor transmits the content related to the preparation of the dish corresponding to the recipe to the user at the selected space at the selected date and time.

6. The management server according to claim 1, wherein:
    the user information includes use history information of the service by the user and profile information of the user, and
    the determining comprises automatically determining the recipe from among the plurality of recipes based on at least one of the use history information and the profile information included in the user information, the confirmation information, and the constraint information.

7. The management server according to claim 1, wherein:
    the user information includes use history information of the service by the user and profile information of the user, and
    wherein the determining comprises:
        automatically selecting at least one recipe from among the plurality of recipes based on at least one of the use history information and the profile information included in the user information, presenting the at least one recipe to the user via the first terminal, and receiving input from the user via the first terminal of a selection of the selected recipe from among the at least one recipe presented to the user.

8. The management server according to claim 7, wherein the hardware processor, under control of the stored program, automatically performs the ordering in response to input of the selection of the selected recipe by the user.

9. The management server according to claim 1, wherein:
the company information further includes date and time information set by the company on a plurality of dates and times at which the at least one designated space is available for use for cooking by the user, and
the selected date and time is selected by the user from among the plurality of dates and times.

10. The management server according to claim 9, wherein the company is distinct from the user and provides the at least one designated space for use for cooking by the user.

11. A system comprising:
a server including a hardware processor and a storage; and
a terminal operable by a user and communicably connected to the server via a network,
wherein:
the storage stores:
user information on the user;
company information including (i) designated space information regarding at least one designated space designated by a company as a space equipped for cooking by the user, each of the at least one designated space being a space different from a home kitchen of the user, and (ii) constraint information regarding a constraint placed on use of each of the at least one designated space by the user, the constraint information including information on constraints placed on use of cooking equipment and utensils in the designated space, for each of the at least one designated space; and
a plurality of recipes each corresponding to a respective dish; and
the hardware processor, under control of a stored program, executes processes comprising:
obtaining, from the user via the terminal, input of reservation information indicating (i) a selected space from among the at least one designated space, and (ii) a selected date and time;
in response to obtaining the reservation information, outputting a request, based on the stored company information, for use of the selected space at the selected date and time indicated in the reservation information;
generating confirmation information in response to receiving a response that the selected space is available for use at the selected date and time, the confirmation information being generated based on the reservation information and the company information stored in the storage and including the selected date and time at which the selected space is available for use; and
in response to generating the confirmation information, automatically:
determining, based on the user information, the confirmation information, and the company information stored in the storage, a recipe of at least one dish from among the plurality of recipes, the recipe being a recipe which can be prepared by the user at the selected space at the selected date and time included in the generated confirmation information, under the constraints placed on the selected space at the selected date and time included in the confirmation information;
in response to determining the recipe, automatically ordering at least one ingredient and a seasoning necessary for making the at least one dish corresponding to the recipe having been determined; and
transmitting, to the user, content related to preparation of the dish corresponding to the recipe.

12. A non-transitory computer-readable recording medium having a program stored thereon for controlling a management server including a hardware processor and a storage,
wherein the storage stores:
user information on the user;
company information including (i) designated space information regarding at least one designated space designated by a company as a space equipped for cooking by the user, each of the at least one designated space being a space different from a home kitchen of a user, and (ii) constraint information regarding a constraint placed on use of each of the at least one designated space by the user, the constraint information including information on constraints placed on use of cooking equipment and utensils in the designated space, for each of the at least one designated space; and
a plurality of recipes each corresponding to a respective dish, and
wherein the program is executable by the hardware processor to control the management server to execute processes comprising:
obtaining, from the user via the first terminal, input of reservation information indicating (i) a selected space from among the at least one designated space, and (ii) a selected date and time;
in response to obtaining the reservation information, outputting a request, based on the stored company information, for use of the selected space at the selected date and time indicated in the reservation information;
generating confirmation information in response to receiving a response that the selected space is available for use at the selected date and time, the confirmation information being generated based on the reservation information and the company information stored in the storage and including the selected date and time at which the selected space is available for use; and
in response to generating the confirmation information, automatically:
determining, based on the user information, the confirmation information, and the company information stored in the storage, a recipe of a dish from among the plurality of recipes, the recipe being a recipe which can be prepared by the user at the selected space at the selected date and time included in the generated confirmation information, under the constraints placed on the selected space at the selected date and time included in the confirmation information;
in response to determining the recipe, automatically ordering at least one ingredient and a seasoning necessary for making the dish corresponding to the recipe having been determined; and transmitting, to the user, content related to preparation of the dish corresponding to the recipe.

* * * * *